(12) United States Patent
Shin et al.

(10) Patent No.: US 8,013,945 B2
(45) Date of Patent: Sep. 6, 2011

(54) DISPLAY SUBSTRATE AND DISPLAY APPARATUS HAVING THE SAME

(75) Inventors: Kyoung-Ju Shin, Hwaseong-si (KR); Shi-Yul Kim, Yohngin-si (KR); Hye-Young Ryu, Seoul (KR); Mee-Hye Jung, Suwon-si (KR); Jang-Soo Kim, Yongin-si (KR); Su-Hyoung Kang, Bucheon-si (KR)

(73) Assignee: Samsung Electronics Co., Ltd. (KR)

( * ) Notice: Subject to any disclaimer, the term of this patent is extended or adjusted under 35 U.S.C. 154(b) by 921 days.

(21) Appl. No.: 12/005,904

(22) Filed: Dec. 27, 2007

(65) Prior Publication Data

US 2008/0211980 A1   Sep. 4, 2008

(30) Foreign Application Priority Data

Dec. 28, 2006 (KR) ........................ 10-2006-0136079
Mar. 27, 2007 (KR) ........................ 10-2007-0029562
Apr. 9, 2007 (KR) ........................ 10-2007-0034512

(51) Int. Cl.
*G02F 1/1343* (2006.01)
*H01L 29/04* (2006.01)

(52) U.S. Cl. .......... 349/39; 349/104; 349/106; 349/139; 257/59; 257/E29.003

(58) Field of Classification Search .................... 349/39, 349/42, 41, 44, 97, 104, 106, 110, 122, 138, 349/139; 257/59, E29.003
See application file for complete search history.

(56) References Cited

U.S. PATENT DOCUMENTS

| 6,525,788 | B1 | 2/2003 | Nakagawa et al. |
| 2005/0036091 | A1 | 2/2005 | Song |
| 2005/0162580 | A1 | 7/2005 | Kim et al. |
| 2006/0157705 | A1 | 7/2006 | Ki |
| 2008/0211980 | A1* | 9/2008 | Shin et al. .......................... 349/39 |

FOREIGN PATENT DOCUMENTS

| CN | 1373390 | 10/2002 |
| CN | 1540426 | 10/2004 |
| JP | 2002-55350 | 2/2002 |
| JP | 2006-139288 | 6/2006 |
| KR | 10-2004-0033205 | 4/2004 |

(Continued)

OTHER PUBLICATIONS

European Search Report dated Oct. 11, 2010.

(Continued)

*Primary Examiner* — Brian M Healy
(74) *Attorney, Agent, or Firm* — Innovation Counsel LLP

(57) ABSTRACT

A display substrate includes a gate line, a gate insulating layer, a data line, a thin-film transistor (TFT), a storage line, a passivation layer, a color filter layer, a pixel electrode, a first light-blocking layer and a second light-blocking layer. The storage line includes the same material as the gate line. The passivation layer covers the data line. The color filter layer is formed on the passivation layer. The pixel electrode is formed on the color filter layer in each pixel. The first light-blocking layer is formed between adjacent pixel electrodes, and includes the same material as the gate line. The second light-blocking layer is formed between the first light-blocking layer, and includes the same material as the data line. Therefore, an aperture ratio may be increased.

43 Claims, 16 Drawing Sheets

FOREIGN PATENT DOCUMENTS

| KR | 10-2004-0050237 | 6/2004 |
| KR | 10-2005-0052801 | 6/2005 |
| KR | 10-2006-0064811 | 6/2006 |

OTHER PUBLICATIONS

Patent Abstracts of Japan, Publication No. 2002-055350, Feb. 20, 2002, 1 p.

Korean Patent Abstracts, Publication No. 1020040033205, Apr. 21, 2004, 1 p.

Korean Patent Abstracts, Publication No. 1020040050237, Jun. 16, 2004, 1 p.

Korean Patent Abstracts, Publication No. 1020050052801, Jun. 7, 2005, 1 p.

Korean Patent Abstracts, Publication No. 1020060064811, Jun. 14, 2006, 1 p.

Korean Patent Abstracts, Publication No. 1020060116878, Nov. 15, 2006, 1 p.

European Search Report Corresponding to EP 07 02 5153, Oct. 11, 2010, 13 pages.

* cited by examiner

DISPLAY SUBSTRATE AND DISPLAY APPARATUS HAVING THE SAME

CROSS-REFERENCE TO RELATED APPLICATIONS

This application claims priority under 35 U.S.C. §119 to Korean Patent Application No. 2006-136079, filed on Dec. 28, 2006, Korean Patent Application No. 2007-29562, filed on Mar. 27, 2007, and Korean Patent Application No. 2007-34512, filed on Apr. 9, 2007 in the Korean Intellectual Property Office (KIPO), the contents of which are herein incorporated by reference in their entireties.

BACKGROUND OF THE INVENTION

1. Field of the Invention

The disclosure relates to a display substrate and a display apparatus having the display substrate. More particularly, the disclosure relates to a display substrate used for a display apparatus, and a display apparatus having the display substrate, which is capable of improving image display quality.

2. Description of the Related Art

A liquid crystal display (LCD) apparatus includes a thin-film transistor (TFT) substrate, an opposite substrate facing the TFT substrate and a liquid crystal layer disposed between the TFT substrate and the opposite substrate.

The TFT substrate includes an insulating substrate, signal lines, a TFT, a pixel electrode, etc., to drive a plurality of pixels. The signal lines, the TFT, and the pixel electrode are formed on the insulating substrate. The opposite substrate includes a color filter layer, a black matrix, and a common electrode. The color filter layer includes red (R), green (G), and blue (B) color filters. The black matrix is formed at a boundary portion between adjacent color filters. The common electrode faces the pixel electrode.

The image display quality of the LCD apparatus is changed by an alignment degree between the TFT substrate and the opposite substrate. When the TFT substrate is misaligned with the opposite substrate, the image display quality of the LCD apparatus is deteriorated.

In order to prevent the misalignment between the TFT substrate and the opposite substrate of the LCD apparatus, an LCD apparatus of a color filter on array (COA) substrate type has been devised. A color filter layer is formed on the TFT substrate of the COA-type LCD apparatus.

However, the width of the black matrix that is formed on the opposite substrate is increased by a margin for the misalignment between the TFT substrate and the opposite substrate, thereby decreasing an aperture ratio.

SUMMARY OF THE INVENTION

The disclosure relates to a display substrate capable of improving an aperture ratio and image display quality.

The disclosure also relates to a display apparatus having the above-mentioned display substrate.

A display substrate in accordance with one aspect of the disclosure includes a gate line, a gate insulating layer, a data line, a thin film transistor, a storage line, a passivation layer, a color filter layer, a pixel electrode, a first light-blocking layer, and a second light-blocking layer. The gate insulating layer covers the gate line. The data line is formed on the gate insulating layer. The TFT is electrically connected to the gate line and the data line. The storage line and the gate line include the same material. The passivation layer covers the TFT layer. The color filter layer is formed on the passivation layer. The pixel electrode is formed on the color filter layer in each pixel. The first light-blocking layer is formed between adjacent pixel electrodes, and includes the same material as the gate line. The second light-blocking layer is formed between the first light-blocking layer, and the second light-blocking layer includes the same material as the data line.

The color filter layer may include a plurality of color filters having different colors, and the first and second light-blocking layers may be disposed at a boundary portion between the adjacent color filters.

The first light-blocking layer may be connected to the storage line. Alternatively, the first light-blocking layer may be spaced apart from the gate line and the storage line to maintain a floating state. The second light-blocking layer may be spaced apart from the data line to maintain a floating state. Alternatively, the second light-blocking layer may be connected to the data line.

A display substrate in accordance with another aspect of the disclosure includes a gate line, a gate insulating layer, a data line, a thin film transistor (TFT), a storage line, a passivation layer, a color filter layer, a pixel electrode and a light-blocking part. The gate insulating layer covers the gate line. The data line is formed on the gate insulating layer. The TFT is electrically connected to the gate line and the data line. The storage line and the gate line include the same material. The passivation layer covers the data line. The color filter layer is formed on the passivation layer. The pixel electrode is formed on the color filter layer in each pixel. The light-blocking part is formed in a region between the adjacent pixel electrodes. The color filter layer comprises a plurality of color filters having different colors, and the light-blocking part and the data line are disposed at a boundary portion between the adjacent color filters. The light-blocking part may include a first light-blocking layer including the same material as the gate line and a second light-blocking layer including the same material as the data line.

A display substrate in accordance with still another aspect of the disclosure includes a gate line, a gate insulating layer, a data line, a thin film transistor (TFT), a storage line, a color filter layer, a first light-blocking layer and a second light-blocking layer. The gate insulating layer covers the gate line. The data line is formed on the gate insulating layer. The TFT is electrically connected to the gate line and the data line. The storage line and the gate line include the same material. The color filter layer is formed on the gate insulating layer. The pixel electrode is formed on the color filter layer in each pixel. The first light-blocking layer is formed between the adjacent pixel electrodes, and includes the same material as the gate line. The second light-blocking layer includes the same material as the gate line. The second light-blocking layer is electrically separated from the first light-blocking layer. The color filter layer comprises a plurality of color filters having different colors, and the first light-blocking layer is disposed at a boundary portion between the adjacent color filters.

A display apparatus in accordance with still another aspect of the disclosure includes a display substrate, an opposite substrate, and a liquid crystal layer. The display substrate includes a gate line, a gate insulating layer, a thin film transistor (TFT), a storage line, a passivation layer, a color filter layer, a pixel electrode, a first light-blocking layer, and a second light-blocking layer. The gate insulating layer covers the gate line. The data line is formed on the gate insulating layer. The TFT is electrically connected to the gate line and the data line. The storage line and the gate line include the same material. The passivation layer covers the data line. The color filter layer is formed on the passivation layer. The pixel electrode is formed on the color filter layer in each pixel. The first light-blocking layer is formed between adjacent pixel electrodes, and includes the same material as the gate line. The second light-blocking layer is formed between the first light-blocking layer, and includes the same material as the data line. The opposite substrate is combined with the display substrate. The opposite substrate includes a common electrode on a surface facing the display substrate. The liquid crystal layer is interposed between the display substrate and the opposite substrate.

A display apparatus in accordance with still another aspect of the disclosure includes a display substrate, an opposite substrate and a liquid crystal layer. The display substrate includes a gate line, a gate insulating layer, a data line, a thin film transistor (TFT), a storage line, a passivation layer, a color filter layer, a pixel electrode, and a light-blocking part. The gate insulating layer covers the gate line. The data line is formed on the gate insulating layer. The TFT is electrically connected to the gate line and the data line. The storage line and the gate line include the same material. The passivation layer covers the data line. The color filter layer is formed on the passivation layer. The pixel electrode is formed on the color filter layer in each pixel. The light-blocking part is formed in a region between the adjacent pixel electrodes. The opposite substrate includes a common electrode on a surface facing the display substrate. The liquid crystal layer is interposed between the display substrate and the opposite substrate.

A display apparatus in accordance with still another aspect of the disclosure includes a display substrate, an opposite substrate, and a liquid crystal layer. The display substrate includes a gate line, a gate insulating layer, a data line, a thin film transistor (TFT), a storage line, a color filter layer, a first light-blocking layer and a second light-blocking layer. The gate insulating layer covers the gate line. The data line is formed on the gate insulating layer. The TFT is electrically connected to the gate line and the data line. The storage line and the gate line include the same material. The color filter layer is formed on the data line. The pixel electrode is formed on the color filter layer in each pixel. The first light-blocking layer is formed between the adjacent pixel electrodes, and includes the dame material as the gate line. The second light-blocking layer is formed to overlap the data line, and includes the same material as the gate line. The second light-blocking layer is electrically separated from the first light-blocking layer.

A display apparatus in accordance with still another aspect of the disclosure includes a display substrate, an opposite substrate, and a liquid crystal layer. The display substrate includes a thin film transistor (TFT), a color filter layer, a pixel electrode, and a first light-blocking layer. The color filter layer is formed on the TFT. The pixel electrode is formed on the color filter layer in each pixel. The first light-blocking layer is partially formed at a boundary portion between the adjacent pixel electrodes. The opposite substrate includes a black matrix and a common electrode facing the pixel electrode. The black matrix is partially formed at the boundary portion between the adjacent pixel electrodes. The liquid crystal layer is interposed between the display substrate and the opposite substrate.

According to the disclosure, a light-blocking layer formed in a display substrate may prevent light from leaking in a boundary portion between adjacent color filters. Additionally, a first light-blocking layer formed between the adjacent pixel electrodes is electrically separated from a second light-blocking layer overlapping with a data line, so that the load of the data line may be decreased. Furthermore, the portion of the black matrix, which overlaps the light-blocking layer formed in the display substrate, is removed, so that the aperture ratio of a display apparatus may be increased.

BRIEF DESCRIPTION OF THE DRAWINGS

The above and other features and advantages will become more apparent by describing exemplary embodiments with reference to the accompanying drawings, in which.

DESCRIPTION OF THE EMBODIMENTS

Figure 1:
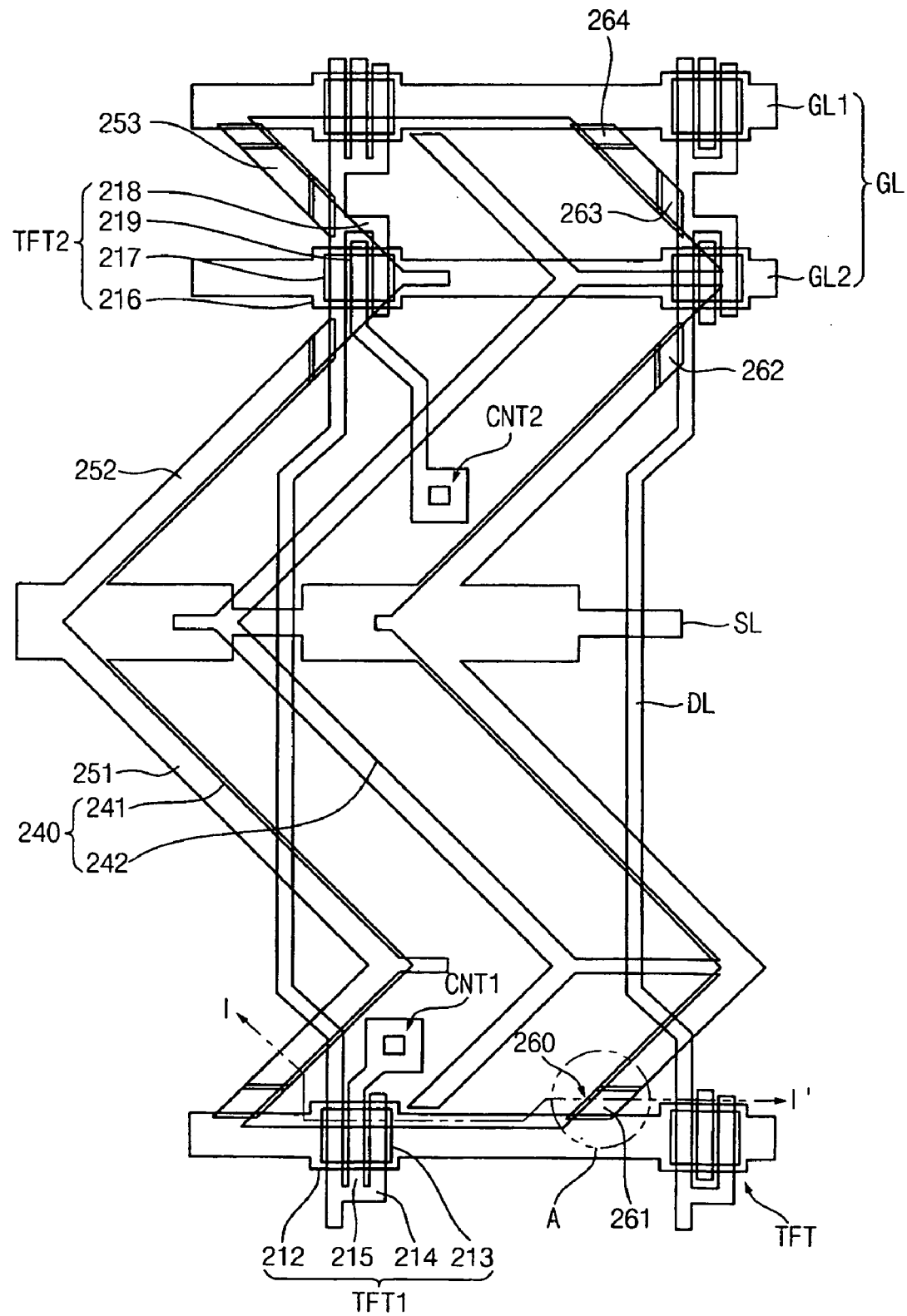
FIG. 1 is a plan view illustrating a display apparatus according to a first exemplary embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings disclosed herein.

Spatially relative terms, such as "beneath," "below," "lower," "above," "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments will be explained in detail with reference to the accompanying drawings.

Figure 2:
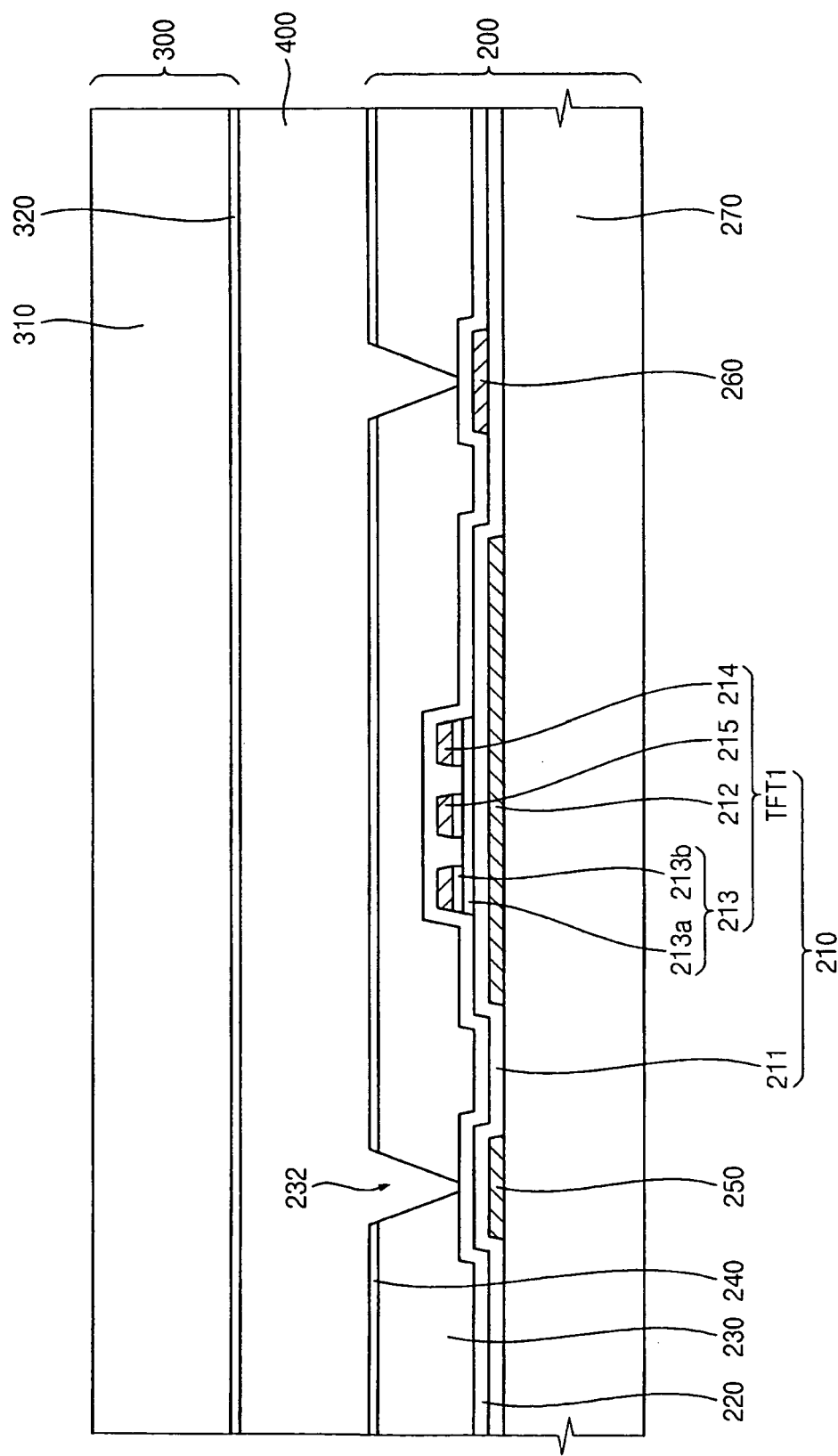
FIG. 2 is a cross-sectional view taken along a line I-I' in FIG. 1.
Figure 3:
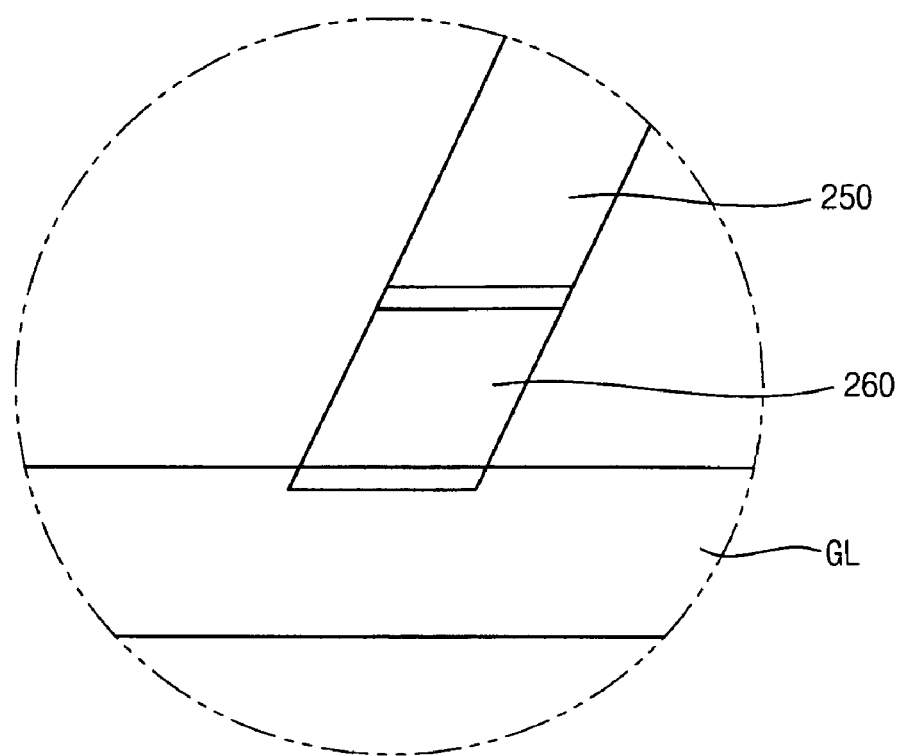
FIG. 3 is an enlarged view illustrating a portion 'A' in FIG. 1.

FIG. 1 is a plan view illustrating a display apparatus according to a first exemplary embodiment. FIG. 2 is a cross-sectional view taken along a line I-I' in FIG. 1. FIG. 3 is an enlarged view illustrating a portion 'A' in FIG. 1.

Referring to FIGS. 1-3, the display apparatus 100 includes a display substrate 200, an opposite substrate 300, and a liquid crystal layer 400.

The display substrate 200 includes a thin-film transistor (TFT) layer 210, a passivation layer 220, a color filter layer 230, a pixel electrode 240, a first light-blocking layer 250, and a second light-blocking layer 260.

The TFT layer 210 is formed on a transparent insulating substrate 270. The transparent insulating substrate 270 includes, for example, glass, plastic, etc.

The TFT layer 210 includes a gate line GL, a gate insulating layer 211, a data line DL, a TFT, and a storage line SL. The gate insulating layer 211 covers the gate line GL. The data line DL is formed on the gate insulating layer 211 to cross the gate line GL. The TFT is electrically connected to the gate line GL and the data line DL. The storage line SL is formed from a first metal layer from which the gate line GL is formed. The storage line SL may include the same material as the gate line GL.

The gate line GL is formed on the insulating substrate 270. The gate line GL may extend, for example, along a horizontal direction, when viewed on a plane.

Each pixel may be divided into two regions that are independently driven. The gate line GL, which is divided into two regions, may include a first gate line part GL1 and a second gate line part GL2 to drive each pixel. The second gate line part GL2 may be formed between the first gate line part GL1 and the storage line SL. Alternatively, the gate line GL may only include the first gate line part GL1.

The storage line SL may be simultaneously formed with the gate line GL from the first metal layer from which the gate line GL is formed. The storage line SL extends, for example, along a parallel direction to the gate line GL between the adjacent gate lines GL. The storage line SL faces the pixel electrode 240, and the gate insulating layer 211. The passivation layer 220 and the color filter layer 230 are disposed between the storage line SL and the pixel electrode 240. The storage line SL, the gate insulating layer 211, the passivation layer 220, the color filter layer 230, and the pixel electrode 240 form a storage capacitor Cst. The storage capacitor Cst maintains a data voltage that is applied to the pixel electrode 240 through the TFT during one frame. Alternatively, when the color filter layer 230 has a hole in a region corresponding to the storage line SL, a distance between the storage line SL and the pixel electrode 240 is decreased, so that a capacitance of the storage capacitor Cst is increased.

The gate insulating layer 211 is formed on the insulating substrate 270 having the gate line GL and the storage line SL formed thereon. The gate insulating layer 211 protects and electrically insulates the gate line GL from other conductors. The gate insulating layer 211 may include, for example, silicon nitride (SiNx).

The data line DL is formed on the gate insulating layer 211. The data line DL is insulated from the gate line GL and the storage line SL by the gate insulating layer 211. The data line DL extends across the gate line GL. The data line DL may be extended, for example, along a vertical direction, when viewed on a plane.

The TFT is formed in each pixel to be connected to the gate line GL and the data line DL. The TFT applies the data voltage that is transferred through the data line DL to the pixel electrode 240 in response to a gate voltage that is transferred through the gate line GL.

The TFT, which is divided into two regions, may include a first TFT part TFT1 and a second TFT part TFT2 to drive each of the pixels. The first TFT part TFT1 is electrically connected to the first gate line part GL1 and the data line DL, and the second TFT part TFT2 is electrically connected to the second gate line part GL2 and the data line DL. Alternatively, the TFT may only include the first TFT part TFT1.

The first TFT part TFT1 may include a first gate electrode 212, a first active layer 213, a first source electrode 214, and a first drain electrode 215. The first gate electrode 212 is electrically connected to the first gate line part GL1, and functions as a gate terminal of the first TFT part TFT1. The first active layer 213 is formed on the gate insulating layer 211 corresponding to the first gate electrode 212. The first active layer 213 may include a semiconductor layer 213a and an ohmic contact layer 213b. For example, the semiconductor layer 213a includes amorphous silicon (a-Si), and the ohmic contact layer 213b includes n+ amorphous silicon (n+ a-Si) having n-type impurities implanted therein at a high concentration. The first source electrode 214 is formed on the first active layer 213 and is electrically connected to the data line DL. The first source electrode 214 functions as a source terminal of the first TFT part TFT1. The first drain electrode 215 is spaced apart from the first source electrode 214 on the first active layer 213 and functions as a drain terminal of the first TFT part TFT1. The first drain electrode 215 is electrically connected to a first pixel electrode 241 through a first contact hole CNT1 formed through the passivation layer 220 and the color filter layer 230.

The second TFT part TFT2 may include a second gate electrode 216, a second active layer 217, a second source electrode 218, and a second drain electrode 219. The second TFT part TFT2 has substantially the same structure as the first TFT part TFT1 except that the second gate electrode 216 is connected to the second gate line part GL2, and the second drain electrode 219 is connected to a second pixel electrode 242 through a second contact hole CNT2 formed through the passivation layer 220 and the color filter layer 230. Thus, any further explanation concerning the above elements will be omitted.

The passivation layer 220 is formed on the TFT layer 210 including the gate line GL, the data line DL, the TFT, and the storage line SL. The passivation layer 220 protects and electrically insulates the TFT layer 210 from other conductors. The passivation layer 220 may include, for example, silicon nitride (SiNx).

The color filter layer 230 is formed on the passivation layer 220. The color filter layer 230 may include a pigment or a colorant. For example, the color filter layer 230 may include a red color filter including a red colorant, a green color filter including a green colorant, and a blue color filter including a blue colorant. The red, green, and blue color filters may be regularly arranged on the TFT layer 220. For example, the red, green, and blue color filters correspond to the pixel parts, respectively.

A thickness of the color filter layer 230 may be increased to planarize a surface of the display substrate 100. For example, the thickness of the color filter layer 230 may be about 2.5 μm to about 3.5 μm.

When the color filter layer 230 is formed in the display substrate 200, an overcoating layer for planarizing the display substrate 200 may be omitted so that the light transmittance of the display apparatus 100 having the color filter layer 230 in the display substrate 200 may be greater than that of a display apparatus having a color filter layer in the opposite substrate 300 by about 7%.

A boundary portion 232 between the color filters having different colors has a recessed shape. When the boundary portion 232 between the color filters having the different colors has a protruded shape liquid crystals of the liquid crystal layer 400 on the protruded boundary portion may be vertically aligned so that liquid crystals of the liquid crystal layer 400 adjacent to the first light-blocking layer 250 may be tilted by the vertically aligned liquid crystals, thereby leaking light adjacent to the first light-blocking layer 250. However, when the boundary portion 232 between the color filters having the different colors has the recessed shape the liquid crystals of the liquid crystal layer 400 on the recessed boundary portion 232 are aligned toward the center of the first light-blocking layer 250 so that the light is not leaked adjacent to the first light-blocking layer 250.

The pixel electrode 240 is formed on the color filter layer 230 in each of the pixels. The pixel electrode 240 includes a transparent conductive material, through which light may be transmitted. The pixel electrode 240 may include, for example, indium tin oxide (ITO), indium zinc oxide (IZO), etc.

The pixel electrode 240 has a zigzag shape that is aligned in the extended direction of the data line DL, thereby improving an aperture ratio. Thus, the pixel electrode 240 is partially overlapped with the data line DL. The passivation layer 220 and the gate insulating layer 211 are interposed between the pixel electrode 240 and the storage line SL to form the storage capacitor Cst.

The pixel electrode 240 may include a first pixel electrode part 241 and a second pixel electrode part 242 to drive each of the pixels, which is divided into two regions. The first pixel electrode part 241 and the second pixel electrode part 242 are electrically separated from each other. The first pixel electrode part 241 is electrically connected to the first drain electrode 215 of the first TFT part TFT1 through the first contact hole CNT1, and the second pixel electrode part 242 is electrically connected to the second drain electrode 219 of the second TFT part TFT2 through the second contact hole CNT2.

The pixel electrode 240 is formed in each of the pixels, and a portion of the color filter layer 230 is exposed between the adjacent pixel electrodes 240. Alternatively, an inorganic layer (not shown) may be formed on the exposed portion of the color filter layer 230 between the adjacent pixel electrodes 240 so that impurities included in the color filter layer 230 may not flow out from the color filter layer 230 toward the liquid crystal layer 400.

The first light-blocking layer 250 is formed in the TFT layer 210 between the adjacent pixel electrodes 240. The first light-blocking layer 250 is formed from the first metal layer from which the gate line GL is formed. The first light-blocking layer 250 may include the same material as the gate line GL. Thus, the first light-blocking layer 250 is disposed in a region between adjacent pixels, which corresponds to the boundary portion 232 between the adjacent color filters, so that light incident into the region between the adjacent pixels is blocked, thereby increasing contrast ratio. For example, when a distance between the adjacent pixel electrodes 240 is about 8 μm, a width of the first light-blocking layer 250 may be no more than about 10 μm. When a black matrix is formed on the opposite substrate 300, the black matrix that is spaced apart from the display substrate 200, may require a width of about 12 μm to compensate for misalignment between the display substrate 200 and the opposite substrate 300. Thus, the aperture ratio of the display apparatus having the first light-blocking layer 250 formed in the display substrate 200 may be greater than that of the display apparatus having the black matrix formed on the opposite substrate 300 by about 2%. In addition, optical difference between adjacent domains caused by the misalignment between the display substrate 200 and the opposite substrate 300, may be prevented, to increase image uniformity at various viewing angles. Furthermore, the black matrix that is formed on the opposite substrate 300 is omitted so that an overcoating layer for planarizing the opposite substrate 300 having the black matrix may also be omitted. Thus, manufacturing costs may be decreased, and luminance may be improved.

The first light-blocking layer 250 is spaced apart from the gate line GL. The first light-blocking layer 250 may be electrically connected to the storage line SL in which a common voltage is applied. Alternatively, the first light-blocking layer 250 is spaced apart from the gate line GL and the storage line SL to maintain a floating state.

When the gate line GL includes the first gate line part GL1 and the second gate line part GL2, the first light-blocking layer 250 includes a first light-blocking part 251, a second light-blocking part 252, and a third light-blocking part 253. The first light-blocking part 251 is formed between the gate line part GL1 and the storage line SL. The second light-blocking part 252 is formed between the second gate line part GL2 and the storage line SL. The third light-blocking part 253 is formed between the first gate line part GL1 and the second gate line part GL2. A first end portion of the first light-blocking part 251 is spaced apart from the first gate line part GL1 at a predetermined distance, and a second end portion of the first light-blocking part 251 is connected to the storage line SL. A first end portion of the second light-blocking part 252 is connected to the storage line SL, and a second end portion of the second light-blocking part 252 is spaced apart from the second gate line part GL2 at a predetermined distance. A first end portion of the third light-blocking part 253 is spaced apart from the second gate line part GL2 at a predetermined distance, and a second end portion of the third light-blocking part 253 is connected to the second gate line part GL2. As described above, the first light-blocking layer 250 covers most of the boundary portion between the adjacent color filters. However, the first light-blocking layer 250 does not cover a portion of a region adjacent to the gate line GL.

The second light-blocking layer 260 covers a region that is not covered by the first light-blocking layer 250 on the boundary portion between the adjacent color filters.

The second light-blocking layer 260 is formed in the TFT layer 210 between the adjacent pixel electrodes 240. The second light-blocking layer 260 is formed from a second metal layer from which the data line DL is formed. The second light-blocking layer 260 may include the same material as the data line DL. The second light-blocking layer 260 is electrically insulated from the first light-blocking layer 250 and the gate line GL by the gate insulating layer 211. The second light-blocking layer 260 may be electrically connected to the data line DL. Alternatively, the second light-blocking layer 260 may be spaced apart from the data line DL to maintain a floating state.

The second light-blocking layer 360 is formed between the first light-blocking layer 250 and the gate line GL on the boundary portion between the adjacent color filters. The second light-blocking layer 360 includes a fourth light-blocking part 261, a fifth light-blocking part 262, a sixth light-blocking part 263, and a seventh light-blocking part 264. The fourth light-blocking part 261 is formed between the first gate line part GL1 and the first light-blocking part 251. The fifth light-blocking part 262 is formed between the second gate line part GL2 and the second light-blocking part 252. The sixth light-blocking part 263 is formed between the second gate line part GL2 and the third light-blocking part 253. The seventh light-blocking part 264 is formed between the first gate line part GL1 and the third light-blocking part 253. The fourth light-blocking part 261 and the seventh light-blocking part 264 are spaced apart from the data line DL to maintain a floating state. The fifth light-blocking part 262 and the sixth light-blocking part 263 are electrically connected to the data line DL.

As described above, the first and second light-blocking layers 250 and 260 entirely cover the boundary portion between the adjacent color filters to decrease light leaking in the boundary portion between the adjacent color filters.

The opposite substrate 300 is combined with the display substrate 200 to interpose the liquid crystal layer 400 between the opposite substrate 300 and the display substrate 200. The opposite substrate 300 includes an insulating substrate 310 and a common electrode 320 that is formed on a surface of the insulating substrate 310 facing the display substrate 200. The common electrode 320 includes a transparent conductive material that transmits light. For example, the common electrode 320 includes indium zinc oxide (IZO), indium tin oxide (ITO), etc. The common electrode 320 may include substantially the same material as the pixel electrode 240. The common electrode 320 may have an opening pattern to increase a viewing angle.

When the first light-blocking layer 250 and the second light-blocking layer 260 are formed in the display substrate 200, a black matrix that is formed on the opposite substrate 300 is omitted, so that an overcoating layer for planarizing the opposite substrate 300 having the black matrix may also be omitted. Thus, manufacturing costs may be decreased, and luminance may be improved.

The liquid crystal layer 400 includes liquid crystals that have various electrical and optical characteristics such as anisotropy of refractivity, anisotropy of dielectric constant, etc. The liquid crystals of the liquid crystal layer 400 vary arrangement in response to an electric field formed between the pixel electrode 240 and the common electrode 320. Thus, the light transmittance of the liquid crystal layer 400 is changed to display the image.

Figure 4:
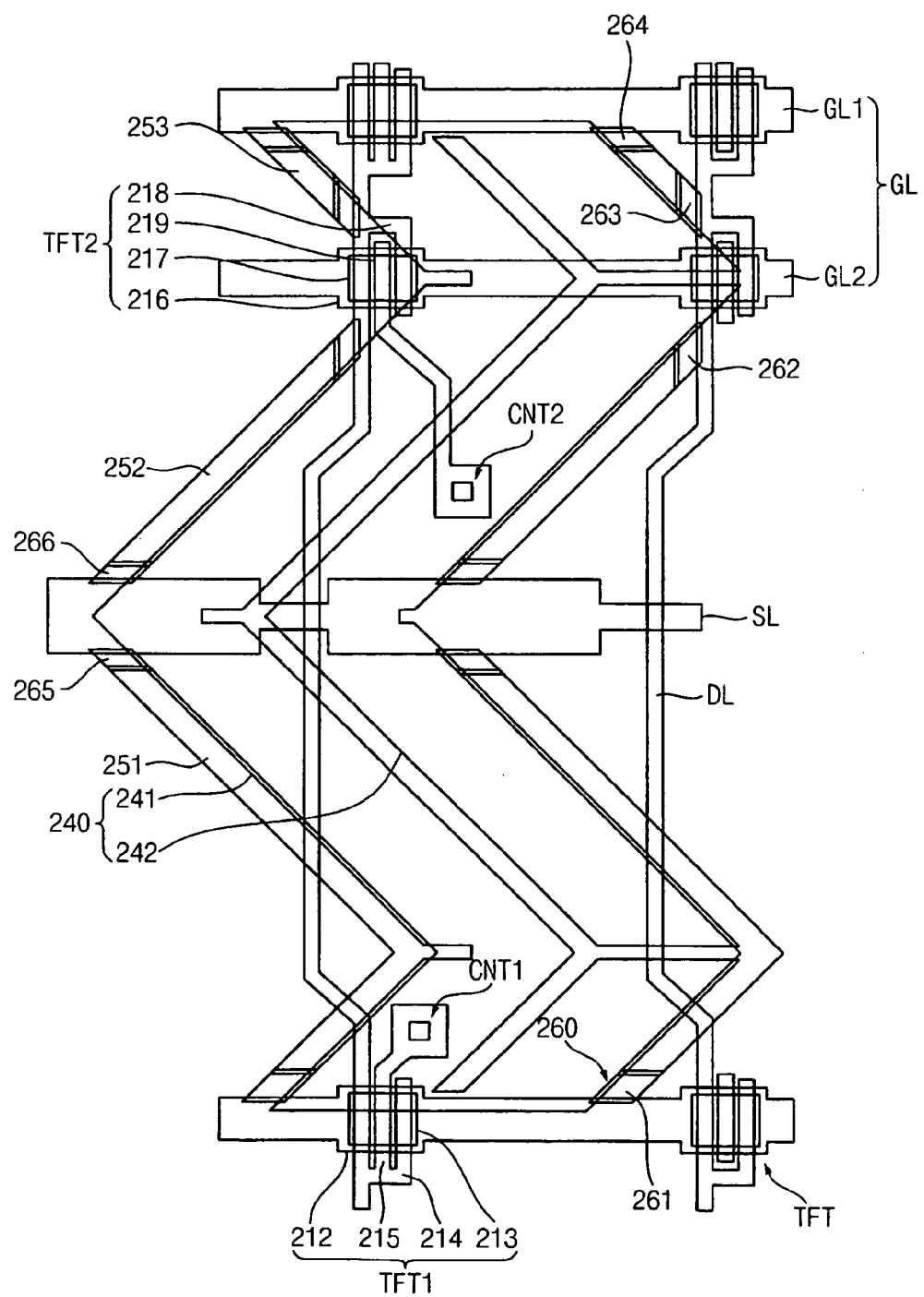
FIG. 4 is a plan view illustrating a display apparatus according to a second exemplary embodiment.

FIG. 4 is a plan view illustrating a display apparatus according to a second exemplary embodiment. The display apparatus of FIG. 4 is substantially the same as in FIG. 1 except for first and second light-blocking layers. Thus, the same reference numerals will be used to refer to the same or like parts as those described in FIG. 1 and any further explanation concerning the above elements will be omitted.

Referring to FIG. 4, the first light-blocking layer 250 is spaced apart from the storage line SL at a predetermined distance to maintain a floating state. The second light-blocking layer 260 may be further formed between the first light-blocking layer 250 and the storage line SL to cover a region between the first blocking layer 250 and the storage line SL.

For example, the first light-blocking part 251 and the second light-blocking part 252 are spaced apart from the storage line SL at a predetermined distance. The second light-blocking layer 260 includes an eighth light-blocking part 265 and a ninth light-blocking part 266 to cover regions between the first and second light-blocking parts 251 and 252 and the storage line SL. The eighth light-blocking part 265 is formed between the storage line SL and the first light-blocking part 251, and the ninth light-blocking part 266 is formed between the storage line SL and the second light-blocking part 252. For example, the eighth and ninth light-blocking parts 265 and 266 are spaced apart from the data line DL to maintain a floating state.

Figure 5:
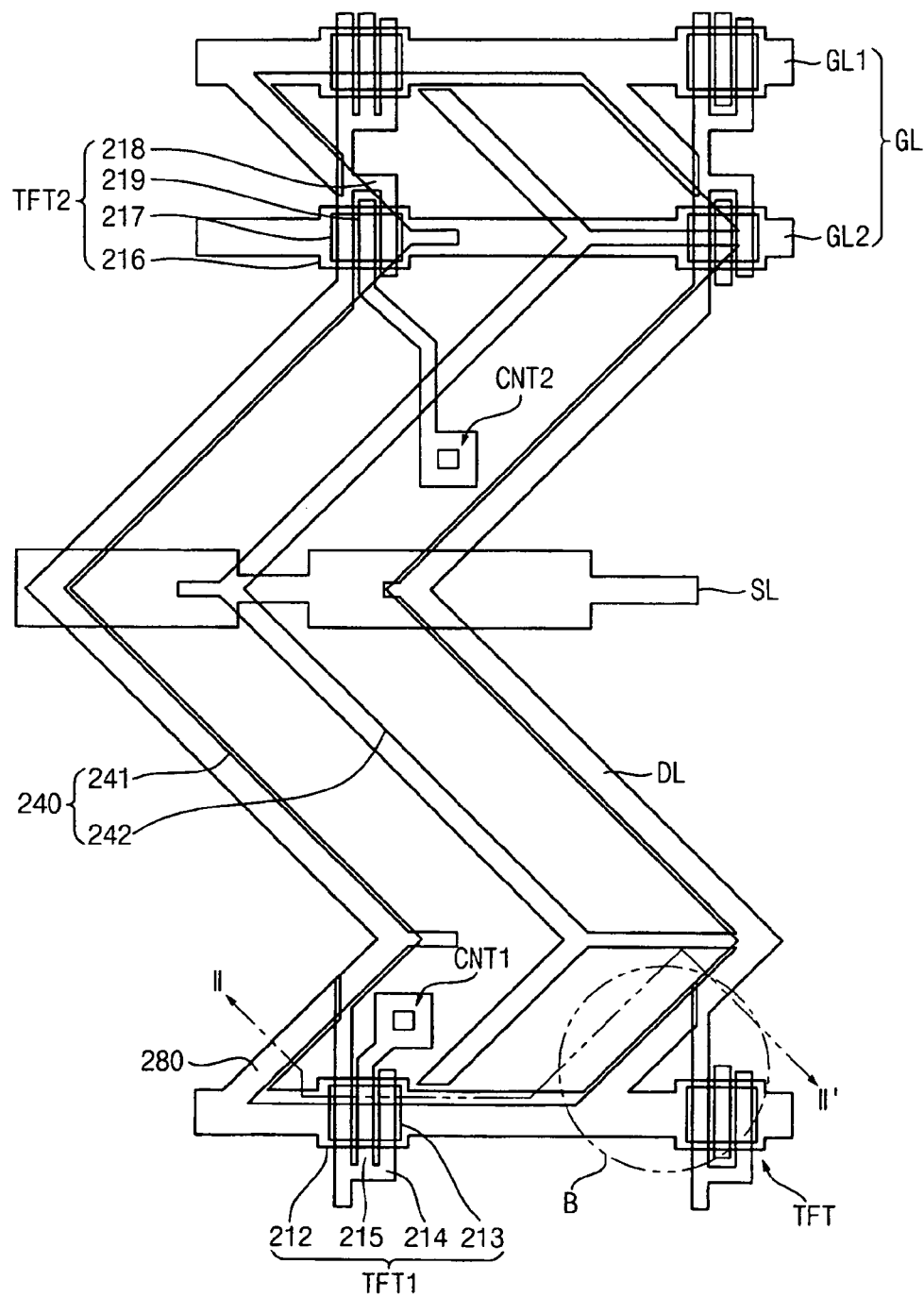
FIG. 5 is a plan view illustrating a display apparatus according to a third exemplary embodiment.
Figure 6:
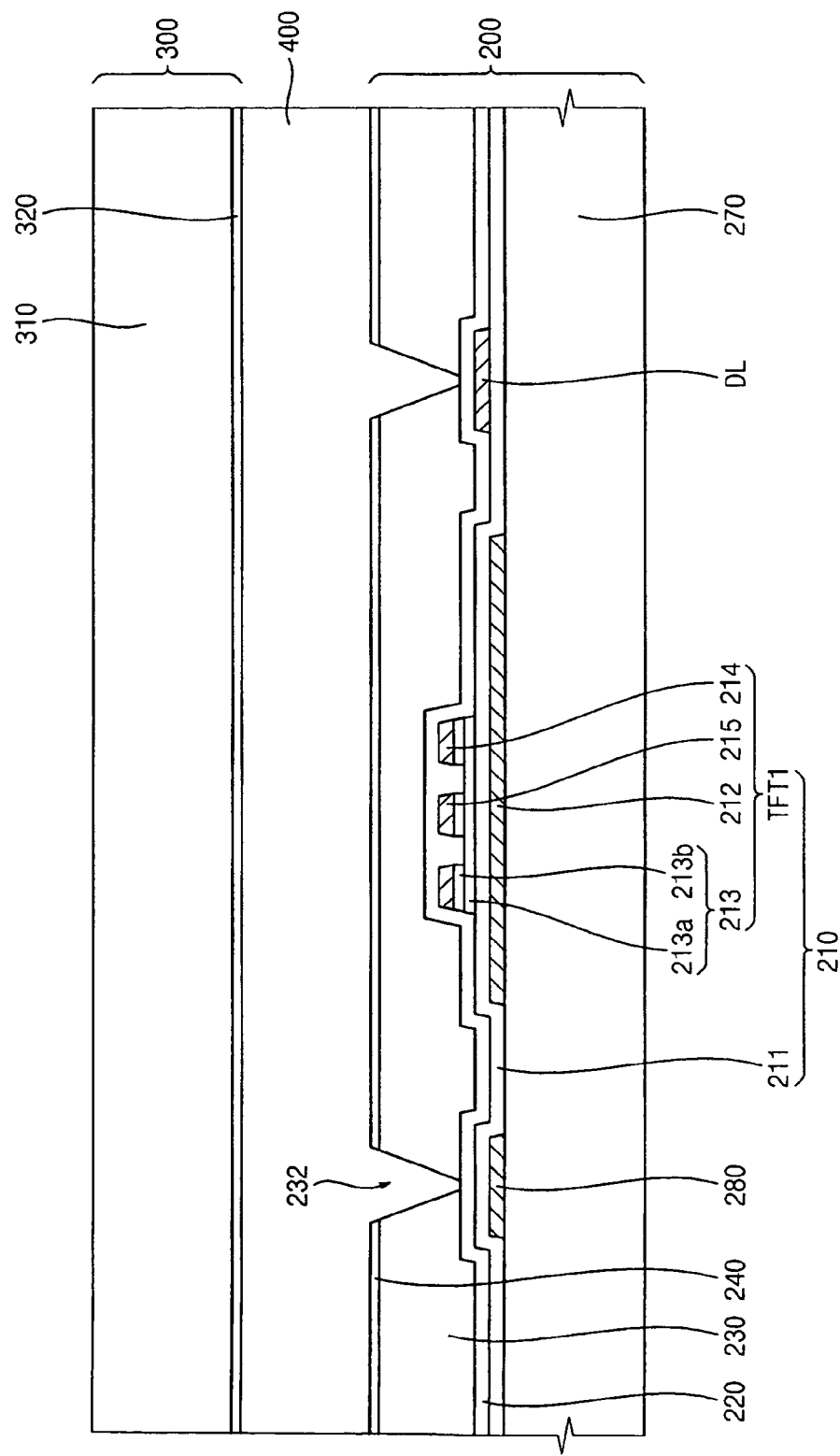
FIG. 6 is a cross-sectional view taken along a line II-II' in FIG. 5.
Figure 7:
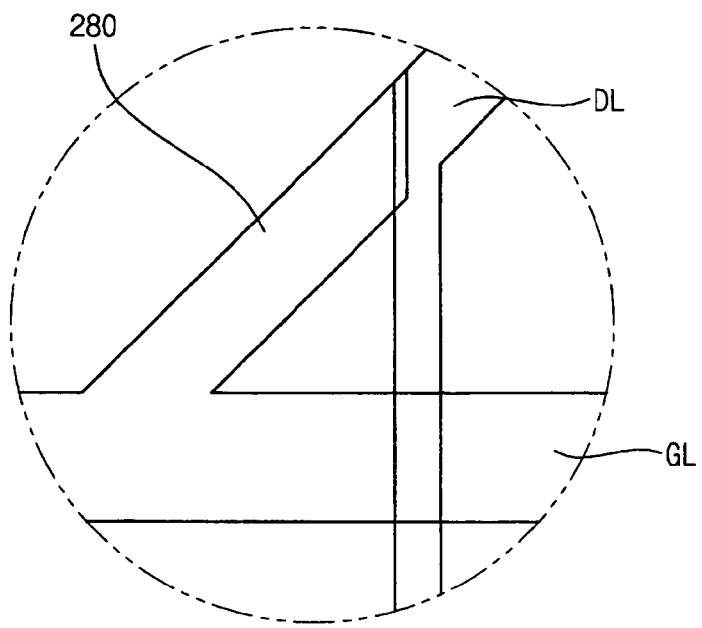
FIG. 7 is an enlarged plan view illustrating a portion 'B' in FIG. 5.

FIG. 5 is a plan view illustrating a display apparatus according to a third exemplary embodiment, FIG. 6 is a cross-sectional view taken along a line II-II' in FIG. 5, and FIG. 7 is an enlarged plan view illustrating a portion 'B' in FIG. 5. The display apparatus of FIGS. 5 and 6 is substantially the same as in FIGS. 1 and 2 except for a display substrate. Thus, the same reference numerals will be used to refer to the same or like parts as those described in FIGS. 1 and 2 and any further explanation concerning the above elements will be omitted.

Referring to FIGS. 5-7, the data line DL is formed between the adjacent pixel electrodes 240. In other words, the data line DL is zigzag shaped and extends a vertical direction along the gate line GL. Similarly, the pixel electrode 240 has a zigzag shape and is aligned in a vertical direction with the gate line GL. For example, the data line DL is formed at the boundary portion between the adjacent color filters between the first gate line part GL1 and the second gate line part GL2 that are disposed at both sides of the storage line SL, respectively. Thus, the data line DL is formed at the boundary portion between the adjacent color filters, which corresponds to a region between adjacent pixels, to prevent light from leaking in the region between adjacent pixels.

However, the data line DL does not cover a portion of the boundary portion between the adjacent color filters to form the TFT. For example, the data line DL does not cover the boundary portion between the adjacent color filters in a region adjacent the first gate line part GL1.

A light-blocking part 280 covers the region adjacent the first gate line part GL1 of the boundary portion between the adjacent color filters.

The light-blocking part 280 is formed in the TFT layer 210. The light-blocking part 280 is disposed between the adjacent pixel electrodes 240 to cover a region that is not covered by the data line DL. For example, the light-blocking part 280 is formed between the first gate line part GL1 and the data line DL. Thus, the data line DL and the light-blocking part 280 are disposed in the boundary portion between the adjacent color filters, which corresponds to the region between the adjacent pixels.

As described above, the data line DL and the light-blocking part 280 entirely cover the boundary portion between the adjacent color filters, so that light leaking in the boundary portion between the adjacent color filters may be decreased.

The light-blocking part 280 may be formed from the first metal layer from which the gate line GL is formed. When the light-blocking part 280 is formed from the first metal layer, the light-blocking part 280 is electrically connected to the gate line GL, and is insulated from the data line DL by the gate insulating layer 211.

Figure 8:
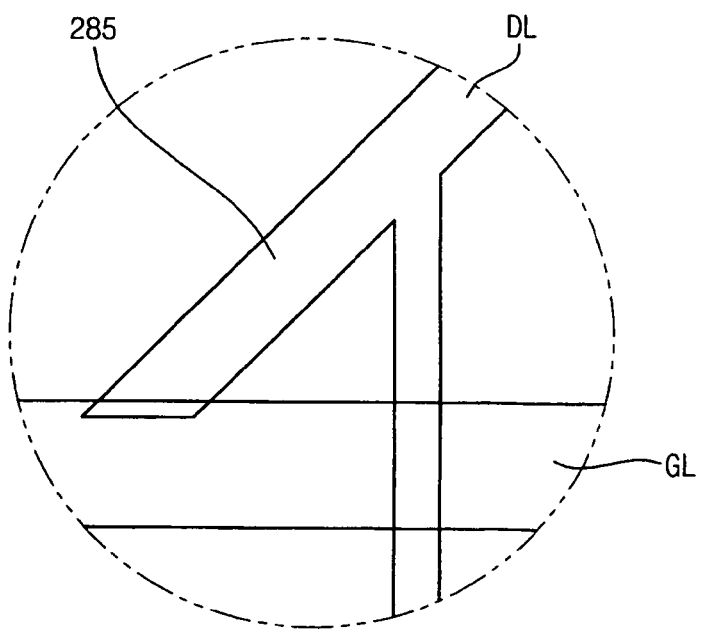
FIG. 8 is an enlarged plan view illustrating a light-blocking part according to a fourth exemplary embodiment.

FIG. 8 is an enlarged plan view illustrating a light-blocking part according to a fourth exemplary embodiment.

Referring to FIG. 8, a light-blocking part 285 may be formed from the second metal layer from which the data line DL is formed. The light-blocking part 285 may include the same material as the data line DL. When the light-blocking part 285 is formed from the second metal layer, the light-blocking part 285 is electrically connected to the data line DL, and is insulated from the gate line GL by the gate insulating layer 211.

Figure 9:
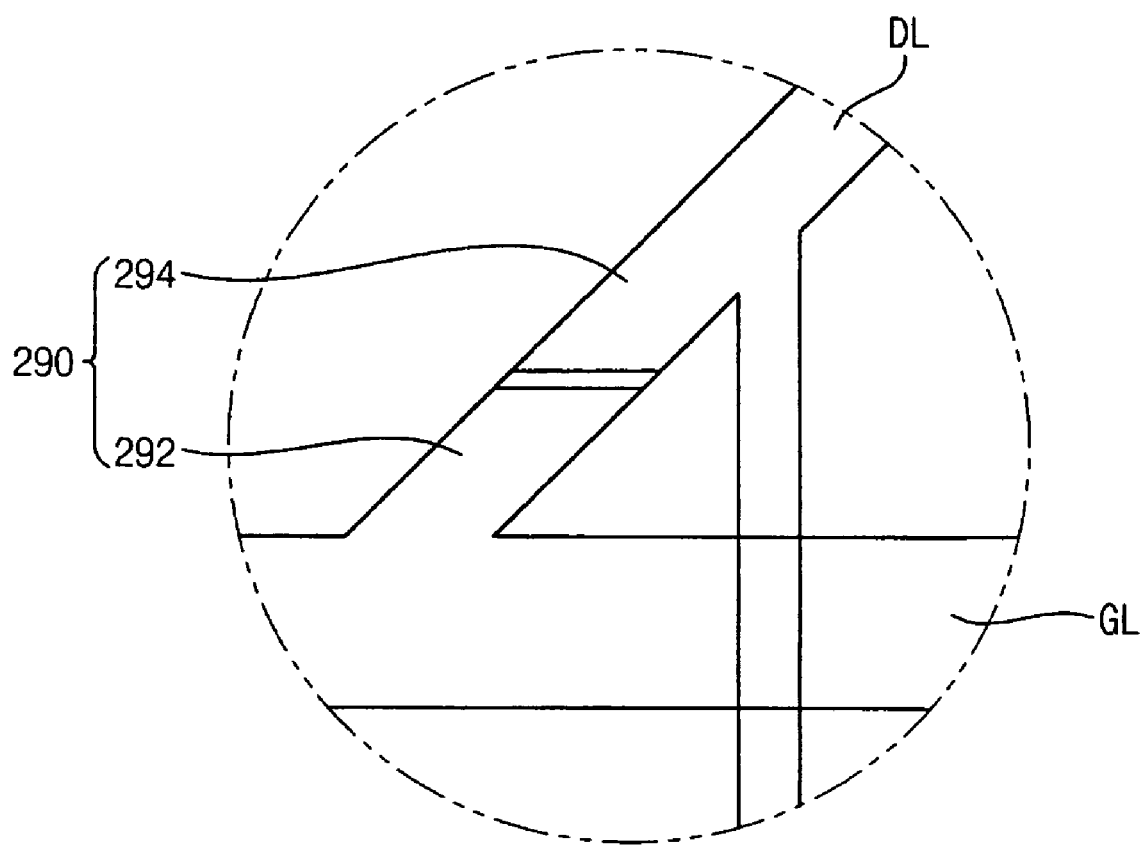
FIG. 9 is an enlarged plan view illustrating a light-blocking part according to a fifth exemplary embodiment.

FIG. 9 is an enlarged plan view illustrating a light-blocking part according to a fifth exemplary embodiment.

Referring to FIG. 9, a light-blocking part 290 includes a first light-blocking layer 292 and the second light-blocking layer 294. The first light-blocking layer 292 is formed from the first metal layer from which the gate line GL is formed, and the second light-blocking layer 294 is formed from the second metal layer from which the data line DL is formed. The first light-blocking layer 292 may include the same material as the gate line GL, and the second light-blocking layer 294 may include the same material as the data line DL. The first light-blocking layer 292 is electrically connected to the gate line GL, the second light-blocking layer 294 is electrically connected to the data line DL, and the first and second light-blocking layers 292 and 294 are insulated from each other by the gate insulating layer 211.

As described above, the light-blocking part extended from the gate line or the data line covers the region, which is not covered by the data line DL, at the boundary portion between the adjacent color filters, to decrease light leaking in the boundary portion between the adjacent color filters.

Figure 10:
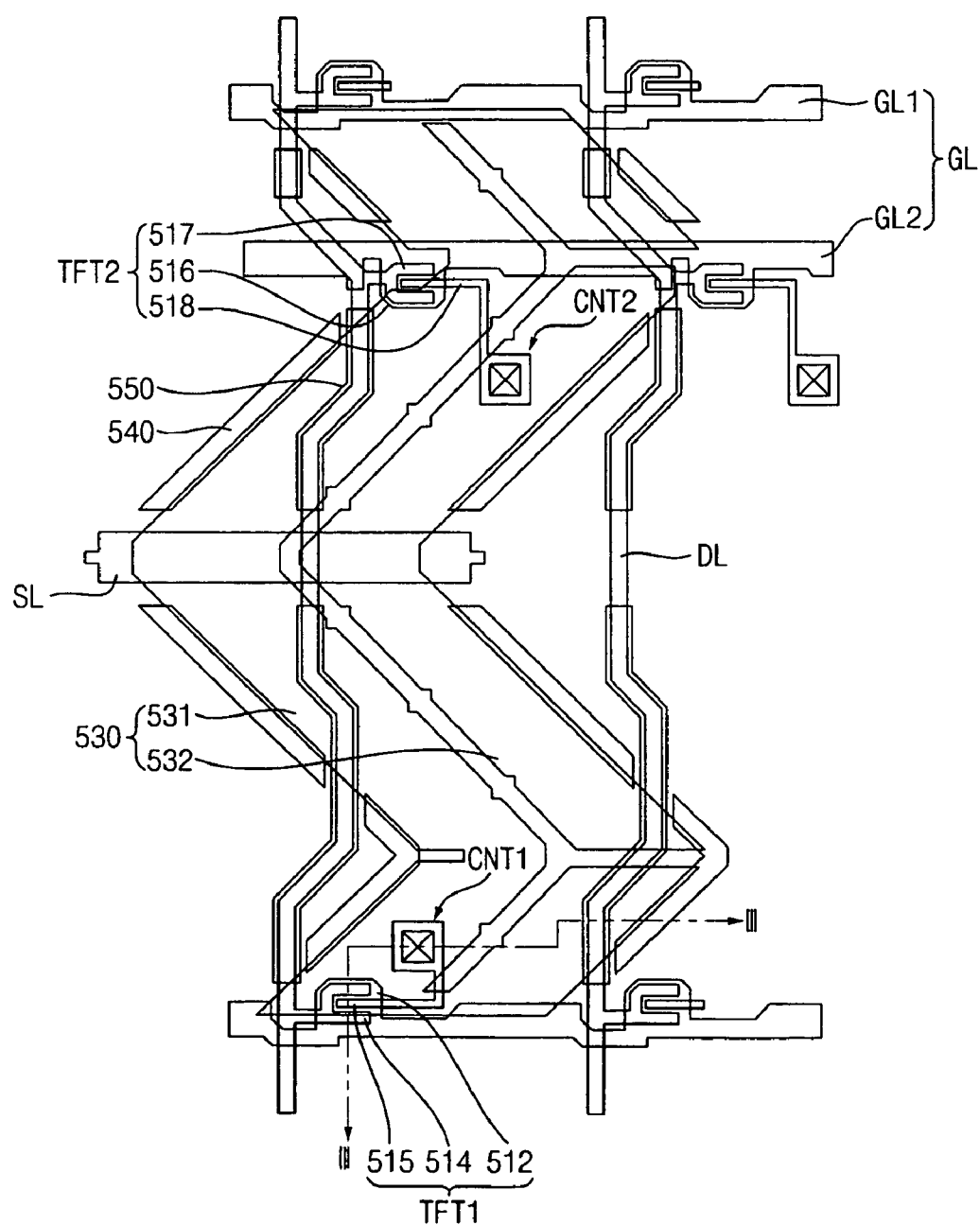
FIG. 10 is a plan view illustrating a display apparatus according to a sixth exemplary embodiment.
Figure 11:
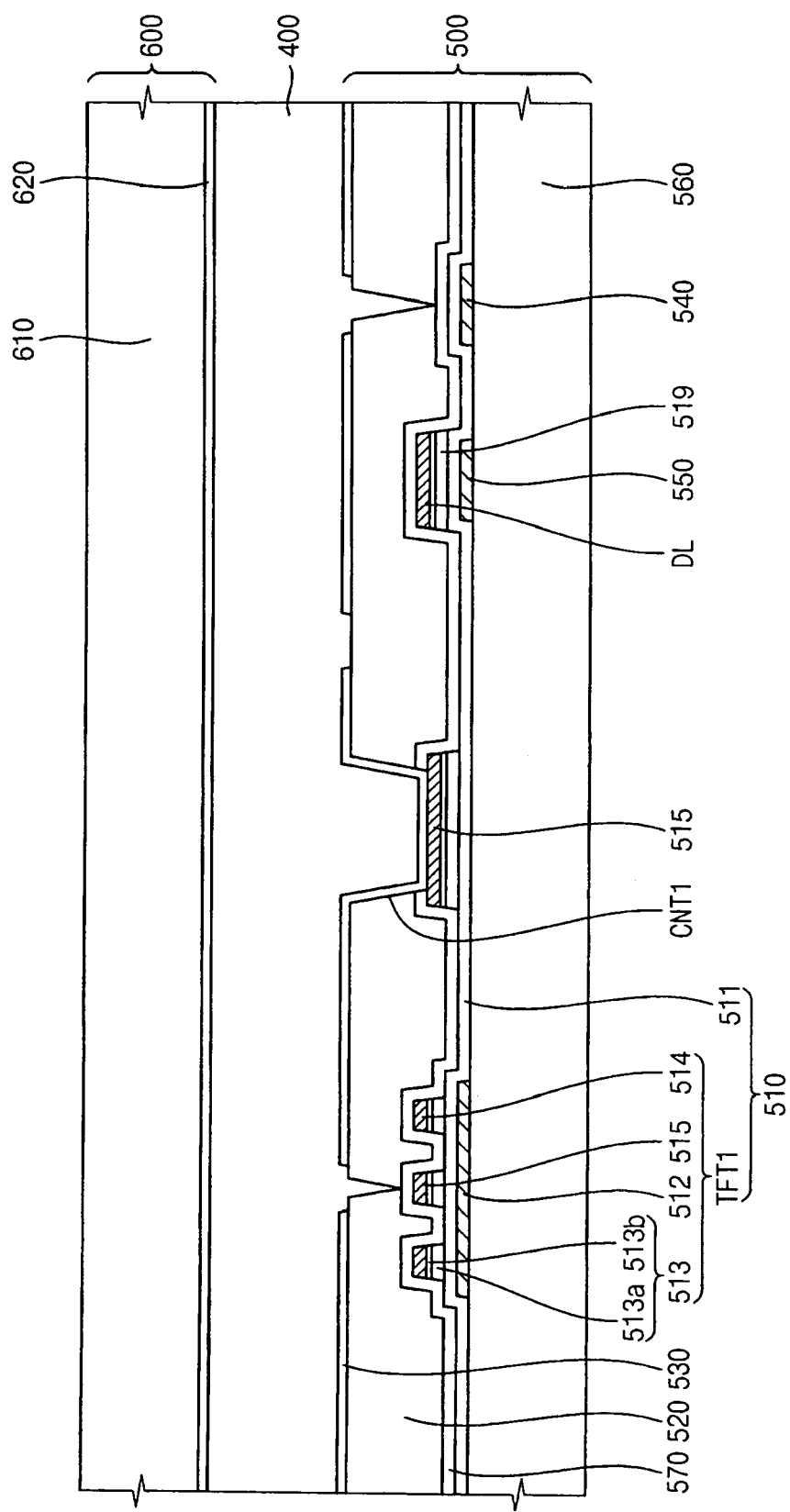
FIG. 11 is a cross-sectional view taken along a line III-III' in FIG. 10.
Figure 12:
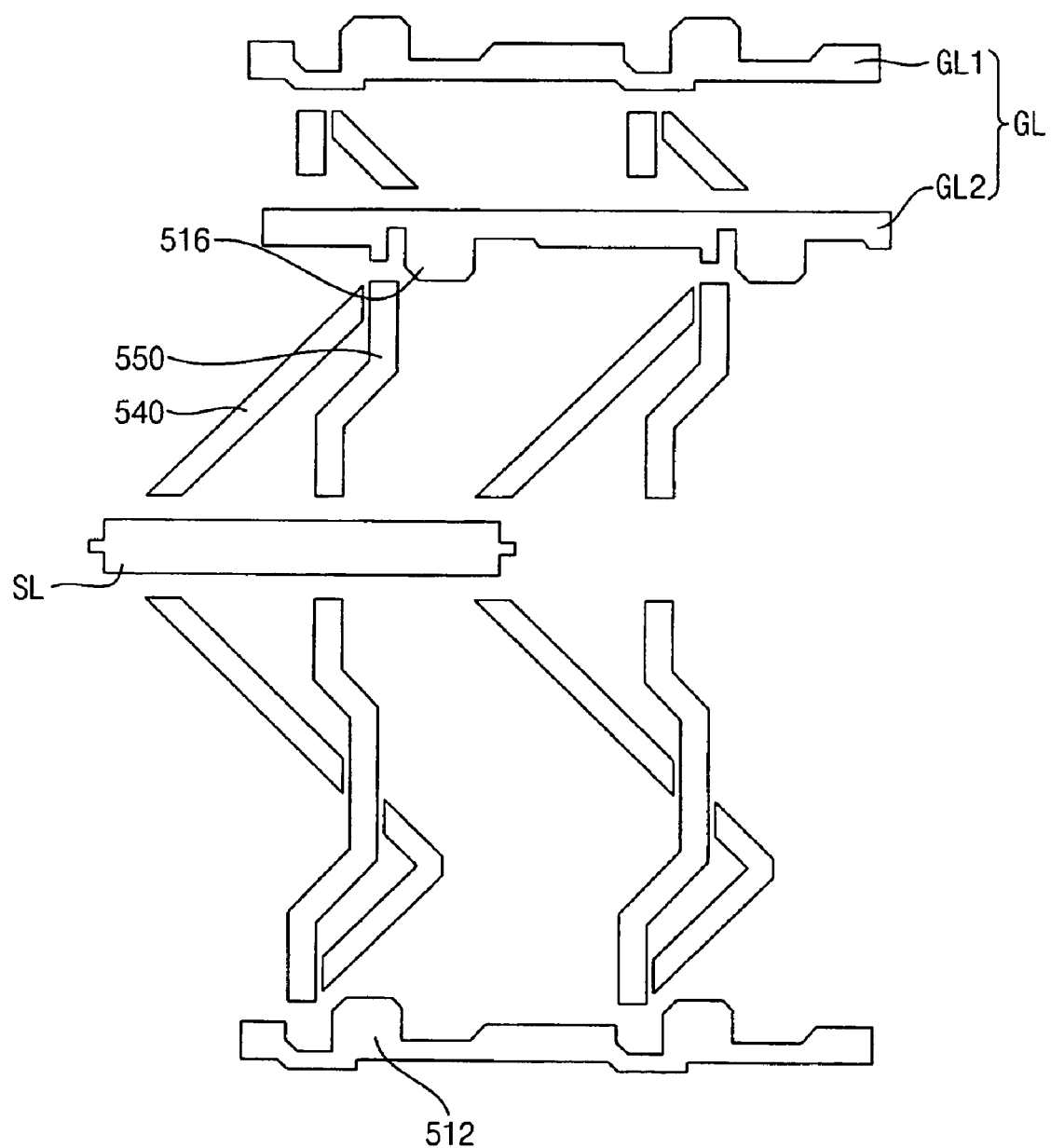
FIG. 12 is a plan view illustrating a first light-blocking layer and a second light-blocking layer in FIG. 10.

FIG. 10 is a plan view illustrating a display apparatus according to a sixth exemplary embodiment. FIG. 11 is a cross-sectional view taken along a line III-III' in FIG. 10. FIG. 12 is a plan view illustrating a first light-blocking layer and a second light-blocking layer in FIG. 10.

Referring to FIGS. 10-12, the display apparatus includes a display substrate 500, an opposite substrate 600 facing the display substrate 500 and a liquid crystal layer 400 interposed between the display substrate 500 and the opposite substrate 600.

The display substrate 500 includes a TFT layer 510, a color filter layer 520, a pixel electrode 530, a first light-blocking layer 540 and a second light-blocking layer 550.

The TFT layer 510 is formed on a transparent insulating substrate 560. The transparent insulating substrate 560 includes, for example, glass, plastic, etc.

The TFT layer 510 includes a gate line GL, a gate insulating layer 511, a data line DL, a TFT, and a storage line SL. The gate insulating layer 511 covers the gate line GL. The data line DL is formed on the gate insulating layer 511 to cross the gate line GL. The TFT is electrically connected to the gate line GL and the data line DL. The storage line SL is formed from a metal layer from which the gate line GL is formed. The storage line SL may include the same material as the gate line GL.

The gate line GL is formed on the insulating substrate 560. The gate line GL may be extended, for example, along a horizontal direction, when viewed on a plane.

Each pixel may be divided into two regions that are independently driven. The gate line GL, which is divided into two regions, may include a first gate line part GL1 and a second gate line part GL2 to drive each pixel. The second gate line part GL2 is electrically separated from the first gate line part GL1, and is extended along a parallel direction to the first gate line part GL1. Alternatively, the gate line GL may only include the first gate line part GL1.

The storage line SL may be simultaneously formed with the gate line GL from the metal layer. The storage line SL is extended, for example, along a parallel direction to the gate line GL between the adjacent gate lines GL. The storage line SL faces the pixel electrode 530, and the gate insulating layer 511, the passivation layer 570 and the color filter layer 520 are disposed between the storage line SL and the pixel electrode 530. The storage line SL, the gate insulating layer 511, the passivation layer 570, the color filter layer 520 and the pixel electrode 530 form a storage capacitor Cst. The storage capacitor Cst maintains a data voltage that is transferred to the pixel electrode 530 through the TFT during one frame. Alternatively, when the color filter layer 520 has a hole in a region corresponding to the storage line SL, a distance between the storage line SL and the pixel electrode 530 is decreased, to increase capacitance of the storage capacitor Cst.

The gate insulating layer 511 is formed on the insulating substrate 560 having the gate line GL and the storage line SL formed thereon. The gate insulating layer 511 protects and electrically insulates the gate line GL from other conductors. The gate insulating layer 511 may include, for example, silicon nitride (SiNx).

The data line DL is formed on the gate insulating layer 511. The data line DL is insulated from the gate line GL and the storage line SL by the gate insulating layer 511. The data line DL is extended along a direction crossing an extended direction of the gate line GL. The data line DL may be extended, for example, along a vertical direction, when viewed on a plane.

The TFT is formed in each pixel to be connected to the gate line GL and the data line DL. The TFT applies the data voltage that is transferred through the data line DL to pixel electrode 530 in response to a gate voltage that is transferred through the gate line GL.

The TFT, which is divided into two regions, may include a first TFT part TFT1 and a second TFT part TFT2 to drive each pixel. The first TFT part TFT1 is electrically connected to the first gate line part GL1 and the data line DL, and the second TFT part TFT2 is electrically connected to the second gate line part GL2 and the data line DL. Alternatively, the TFT may only include the first TFT part TFT1.

The first TFT part TFT1 may include a first gate electrode 512, a first active layer 513, a first source electrode 514, and a first drain electrode 515. The first gate electrode 512 is electrically connected to the first gate line part GL1, and functions as a gate terminal of the first TFT part TFT1. The first active layer 513 is formed on the gate insulating layer 511 corresponding to the first gate electrode 512. The first active layer 513 may include a semiconductor layer 513*a* and an ohmic contact layer 513*b*. For example, the semiconductor layer 513*a* includes amorphous silicon (a-Si), and the ohmic contact layer 513*b* includes n+ amorphous silicon (n+ a-Si) having n-type impurities implanted therein at a high concentration. The first source electrode 514 is formed on the first active layer 513, and is electrically connected to the data line DL. The first source electrode 514 functions as a source terminal of the first TFT part TFT1. The first drain electrode 515 is spaced apart from the first source electrode 514 on the first active layer 513, and functions as a drain terminal of the first TFT part TFT1. The first drain electrode 515 is electrically connected to a first pixel electrode 531 through a first contact hole CNT1 formed through the passivation layer 570 and the color filter layer 520.

The second TFT part TFT2 may include a second gate electrode 516, a second active layer (not shown), a second source electrode 517 and a second drain electrode 518. The second TFT part TFT2 has substantially the same structure as the first TFT part TFT1 except that the second gate electrode 516 is connected to the second gate line part GL2, and the second drain electrode 518 is connected to a second pixel electrode 532 through a second contact hole CNT2 formed through the passivation layer 570 and the color filter layer 520. Thus, any further explanation concerning the above elements will be omitted.

The display substrate 500 may further include the passivation layer 570 formed on the TFT layer 510. The passivation layer 570 protects and electrically insulates the TFT layer 510 from other conductors. The passivation layer 570 may include, for example, silicon nitride (SiNx).

The color filter layer 520 is formed on the passivation layer 570. The color filter layer 520 may include a pigment or a colorant. For example, the color filter layer 520 may include a red color filter including a red colorant, a green color filter including a green colorant, and a blue color filter including a blue colorant. The red, green, and blue color filters may be regularly arranged on the passivation layer 570. For example, the red, green, and blue color filters correspond to the pixel parts, respectively.

A thickness of the color filter layer 520 may be increased to planarize a surface of the display substrate 500. For example, the thickness of the color filter layer 520 may be about 2.5 μm to about 3.5 μm.

When the color filter layer 520 is formed in the display substrate 500, an overcoating layer for planarizing the display substrate 500 may be omitted so that the light transmittance of the display apparatus having the color filter layer 520 in the display substrate 500 may be greater than that of a display apparatus having a color filter layer in the opposite substrate 600 by about 7%.

Alternatively, the display substrate 500 may include an organic insulating layer instead of the color filter layer 520.

The pixel electrode 530 is formed on the color filter layer 520 in each pixel. The pixel electrode 530 includes a transparent conductive material, through which light can be transmitted. The pixel electrode 530 may include, for example, indium tin oxide (ITO), indium zinc oxide (IZO), etc.

The pixel electrode 530 has a zigzag shape that is aligned in the extended direction of the data line DL, thereby improving an aperture ratio. Thus, the pixel electrode 530 is partially overlapped with the data line DL. The passivation layer 570 and the gate insulating layer 511 are interposed between the pixel electrode 530 and the storage line SL to form the storage capacitor Cst.

The pixel electrode 530, which is divided into two regions, may include a first pixel electrode part 531 and a second pixel electrode part 532 to drive each pixel. The first pixel electrode part 531 and the second pixel electrode part 532 are electrically separated from each other. The first pixel electrode part 531 is electrically connected to the first drain electrode 515 of the first TFT part TFT1 through the first contact hole CNT1, and the second pixel electrode part 532 is electrically connected to the second drain electrode 518 of the second TFT part TFT2 through the second contact hole CNT2.

The pixel electrode 530 is formed in each of the pixels, and a portion of the color filter layer 520 is exposed between the adjacent pixel electrodes 530. Alternatively, an inorganic layer (not shown) may be formed on the exposed portion of the color filter layer 520 between the adjacent pixel electrodes 530 so that impurities included in the color filter layer 520 may not flow out from the color filter layer 520 toward the liquid crystal layer 400.

The first light-blocking layer 540 is formed in the TFT layer 510 between the adjacent pixel electrodes 530. The first light-blocking layer 540 is formed from the metal layer from which the gate line GL is formed. Thus, the first light-blocking layer 540 is disposed in a region between adjacent pixels, which corresponds to the boundary portion between the adjacent color filters to block light incident to the region between the adjacent pixels, thereby increasing contrast ratio. For example, when a distance between the adjacent pixel electrodes 530 is about 8 μm, a width of the first light-blocking layer 540 may be no more than about 10 μm. When a black matrix is formed on the opposite substrate 600, the black matrix that is spaced apart from the display substrate 500, may require a width of about 12 μm for compensating for misalignment between the display substrate 500 and the opposite substrate 600. Thus, the aperture ratio of the display apparatus having the first light-blocking layer 540 formed in the display substrate 500 may be greater than that of the display apparatus having the black matrix formed on the opposite substrate 600 by about 2%. In addition, optical difference between adjacent domains, caused by the misalignment between the display substrate 500 and the opposite substrate 600, may be prevented, to increase image uniformity at various viewing angles. Furthermore, the black matrix that is formed on the opposite substrate 600 is omitted so that an overcoating layer for planarizing the opposite substrate 600 having the black matrix may also be omitted. Thus, manufacturing costs may be decreased, and luminance may be improved.

The first light-blocking layer 540 is electrically separated from the gate line GL and the storage line SL to maintain a floating state.

The second light-blocking layer 550 is formed from the metal layer to form the gate line GL and the first light-blocking layer 540. The second light-blocking layer 550 may include the same material as the gate line GL. The second light-blocking layer 550 is overlapped with the data line DL. When the data line DL and the active layer 513 is patterned through one mask, a dummy active layer 519 is formed under the data line DL. When light is incident into the dummy active layer 519, a waterfall defect may be caused. Thus, the second light-blocking layer 550, which is formed under the data line DL, blocks light incident into the dummy active layer 519, to eliminate the waterfall defect.

The second light-blocking layer 550 is electrically separated from the gate line GL and the storage line SL to maintain a floating state.

The second light-blocking layer 550 is electrically separated from the first light-blocking layer 540 to decrease a load of the data line. For example, when the second light-blocking layer 550 maintains the floating state, an electrical potential of the second light-blocking layer 550 is defined by an electrical potential of the data line DL. Thus, the load of the data line DL is not changed by the second light-blocking layer 550. However, when the second light-blocking layer 550 is electrically connected to the first light-blocking layer 540, the electrical potential of the second light-blocking layer 550 is defined by a coupling capacitance between the first light-blocking layer 540 and the pixel electrode 530, to increase the capacitance between the second light-blocking layer 550 and the data line DL.

Table 1 below shows a capacitance between the data line and the pixel electrode according to the first and second light-blocking layers. In Table 1, a display substrate according to Example 1 only includes the second light-blocking layer. A display substrate according to Example 2 only includes the first light-blocking layer. A display substrate according to Example 3 includes the first and second light-blocking layers that are electrically connected to each other. A display substrate according to Example 4 includes the first and second light-blocking layers that were electrically separated from each other, as shown in FIG. 12. In Table 1, $Cdp\_h$ is a capacitance between the first pixel electrode and the data line, and $Cdp\_l$ is a capacitance between the second pixel electrode and the data line.

TABLE 1

| | First light-blocking layer | Second light-blocking layer | $Cdp\_h[F]$ | $Cdp\_l[F]$ |
| --- | --- | --- | --- | --- |
| Example 1 | X | ○ | 1.87E-14 | 8.84E-14 |
| Example 2 | ○ | X | 2.04E-14 | 9.77E-14 |
| Example 3 | ○ | ○ | 2.49E-14 | 1.08E-13 |
| Example 4 | ○ | ○ | 2.07E-14 | 9.94E-14 |

Referring to Table 1, when the display substrate includes the first and second light-blocking layers that are electrically connected to each other, as Example 3, $Cdp\_h$ was increased by about 33%, and $Cdp\_l$ was increased by about 22% in comparison with Example 1. However, when the display substrate includes the first and second light-blocking layers that are electrically separated from each other, as Example 4, $Cdp\_h$ was increased by about 10%, and $Cdp\_l$ was increased by about 12% in comparison with Example 1. As a result, when the first light-blocking layer was electrically separated from the second light-blocking layer, as Example 4, a load of the data line was decreased in comparison with Example 3.

Therefore, when the first light-blocking layer is electrically separated from the second light-blocking layer, the load of the data line may be decreased, so that a delay of a signal transferred through the data line may be decreased.

The opposite substrate 600 is combined with the display substrate 500 to interpose the liquid crystal layer 400 between the opposite substrate 600 and the display substrate 500. The opposite substrate 600 includes an insulating substrate 610 and a common electrode 620 that is formed on a surface of the insulating substrate 610 facing the display substrate 500. The common electrode 620 includes a transparent conductive material that transmits light. For example, the common electrode 620 includes indium zinc oxide (IZO), indium tin oxide (ITO), etc. The common electrode 620 may include substantially the same material as the pixel electrode 530. The common electrode 620 may have an opening pattern to increase a viewing angle.

When the first light-blocking layer 540 is formed in the display substrate 500, a black matrix that is formed on the opposite substrate 600 is omitted, so that an overcoating layer for planarizing the opposite substrate 600 having the black matrix may also be omitted. Thus, manufacturing costs may be decreased, and luminance may be improved.

Figure 13:
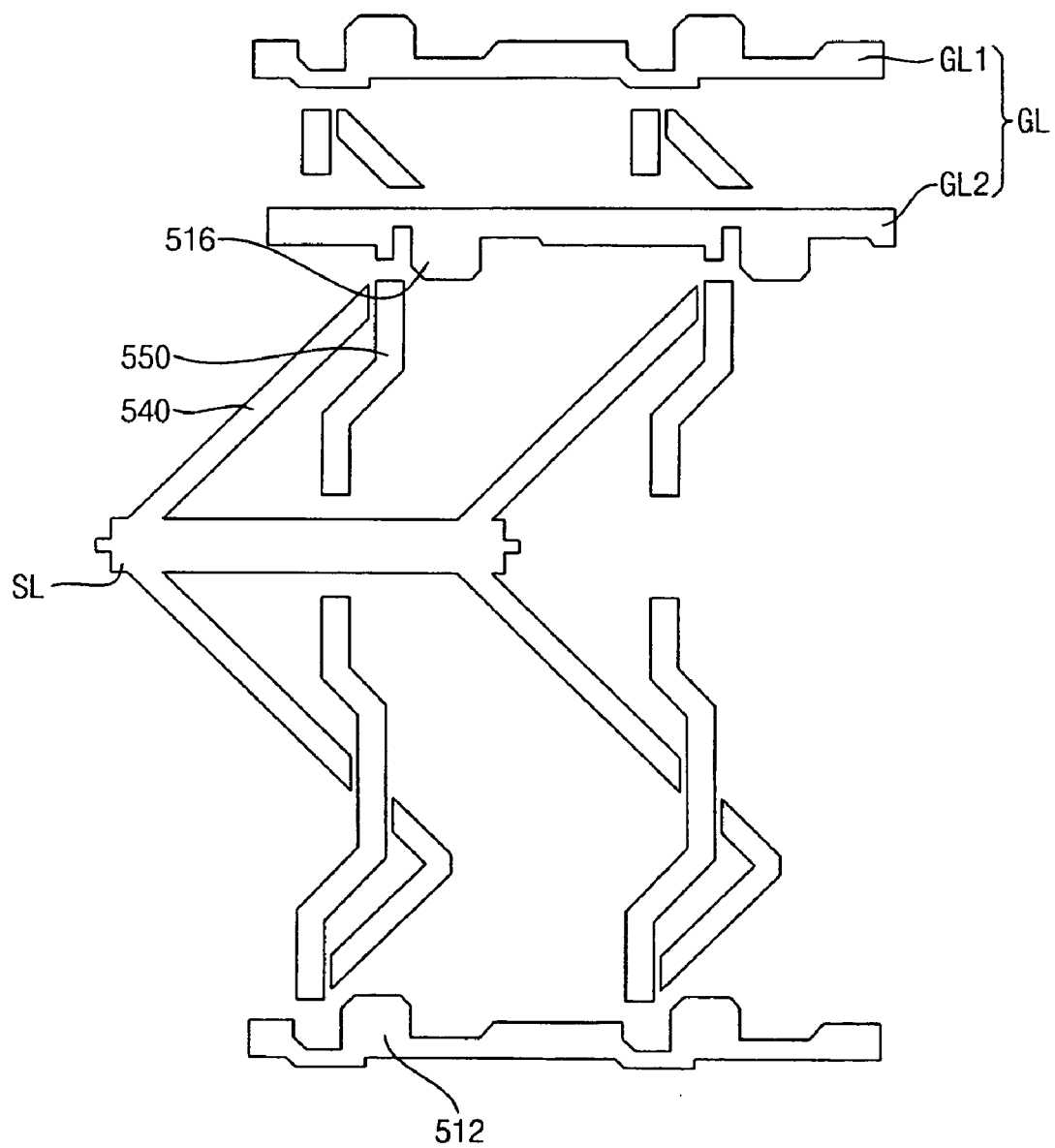
FIG. 13 is a plan view illustrating a display substrate according to a seventh exemplary embodiment.

FIG. 13 is a plan view illustrating a display substrate according to a seventh exemplary embodiment. The display substrate of FIG. 13 is substantially the same as in FIG. 12 except for a first light-blocking layer. Thus, the same reference numerals will be used to refer to the same or like parts as those described in FIG. 12 and any further explanation concerning the above elements will be omitted.

Referring to FIG. 13, a portion of the first light-blocking layer 540 is electrically connected to the storage line SL having an applied a common voltage. In other words, the first light-blocking layer 540 adjacent to the storage line SL is directly connected to the storage line SL.

As described above, when the portion of the first light-blocking layer 540 is connected to the storage line SL, an area of the storage capacitor Cst is increased so that a capacitance of the storage capacitor is increased.

Figure 14:
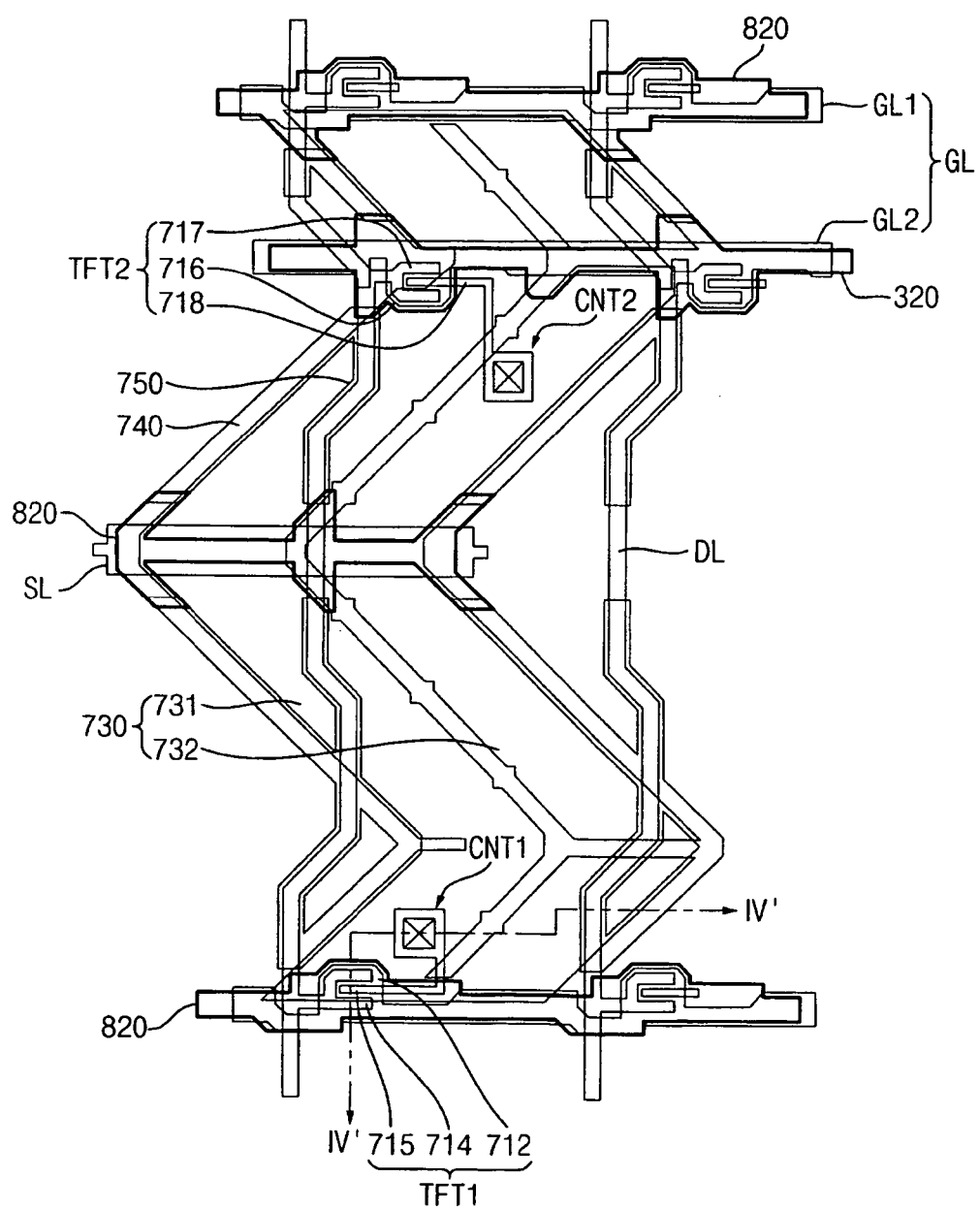
FIG. 14 is a plan view illustrating a display apparatus according to an eighth exemplary embodiment.
Figure 15:
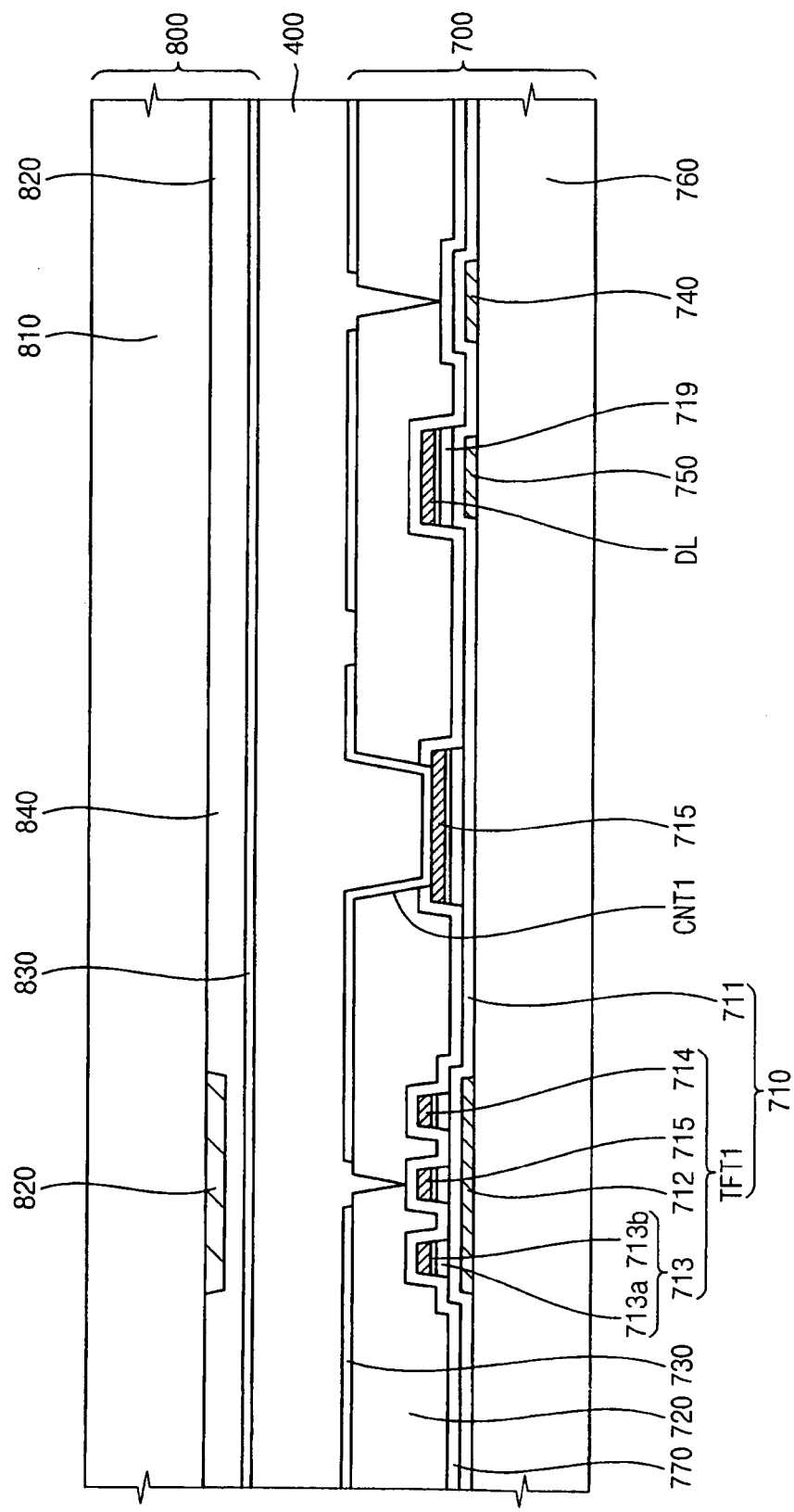
FIG. 15 is a cross-sectional view taken along a line IV-IV' in FIG. 14.
Figure 16:
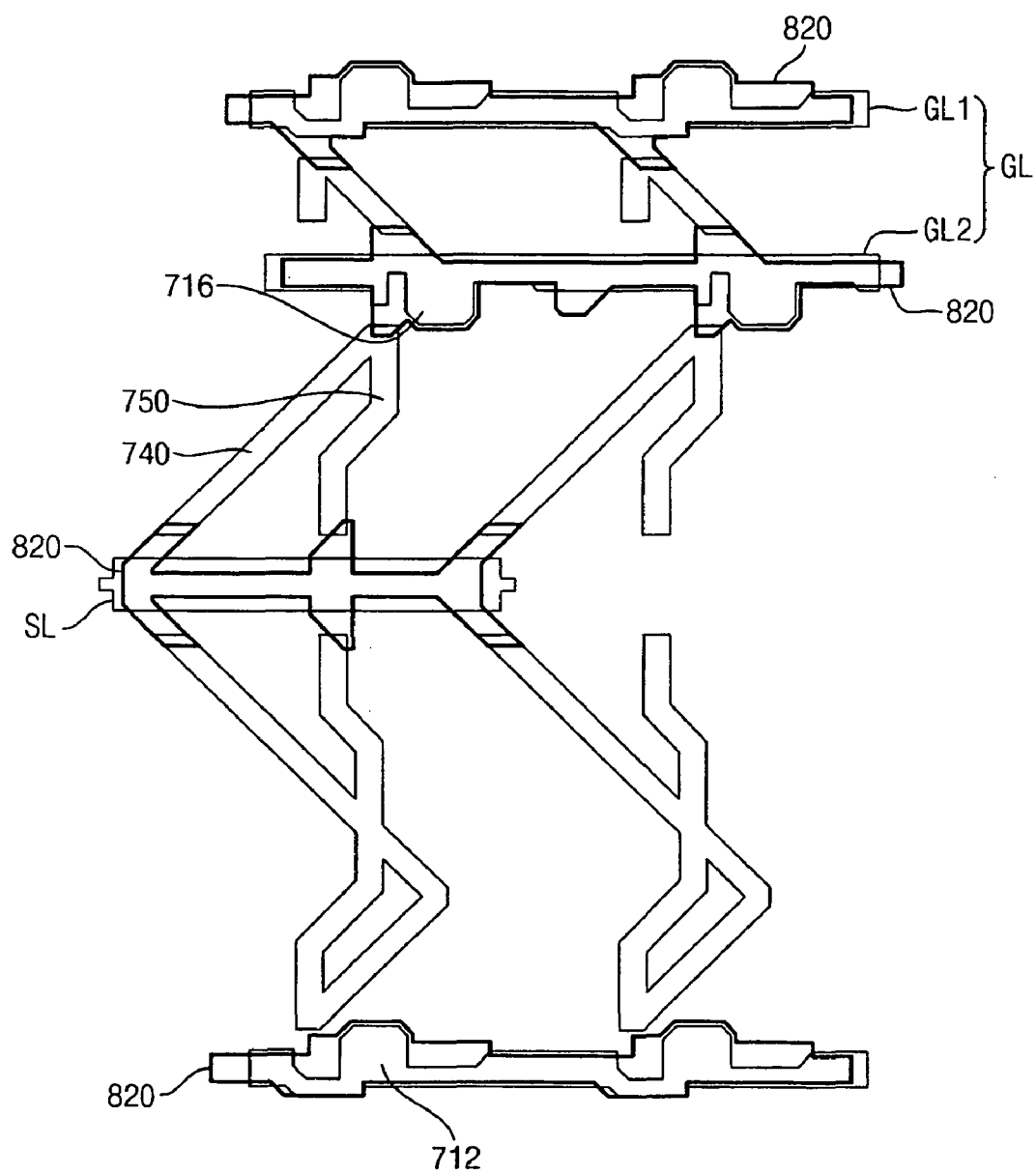
FIG. 16 is a plan view illustrating a light-blocking layer and a black matrix in FIG. 14.

FIG. 14 is a plan view illustrating a display apparatus according to an eighth exemplary embodiment, FIG. 15 is a cross-sectional view taken along a line IV-IV' in FIG. 14, and FIG. 16 is a plan view illustrating a light-blocking layer and a black matrix in FIG. 14.

Referring to FIGS. 14 to 16, the display apparatus includes a display substrate 700, an opposite substrate 800 facing the display substrate 700 and a liquid crystal layer 400 interposed between the display substrate 700 and the opposite substrate 800.

The display substrate 700 includes a TFT layer 710, a color filter layer 720, and a pixel electrode 730.

The TFT layer 710 is formed on a transparent insulating substrate 760. The transparent insulating substrate 760 includes, for example, glass, plastic, etc.

The TFT layer 710 includes a gate line GL, a gate insulating layer 711, a data line DL, a TFT and a storage line SL. The gate insulating layer 711 covers the gate line GL. The data line DL is formed on the gate insulating layer 711 to cross the gate line GL. The TFT is electrically connected to the gate line GL and the data line DL. The storage line SL is formed from a metal layer from which the gate line GL is formed. The storage line SL may include the same material as the gate line GL.

The gate line GL is formed on the insulating substrate 760. The gate line GL may be extended, for example, along a horizontal direction, when viewed on a plane.

Each pixel, which is divided into two regions, may be divided into two regions that are independently driven. The gate line GL may include a first gate line part GL1 and a second gate line part GL2 to drive each pixel. The second gate line part GL2 is electrically separated from the first gate line part GL1, and is extended along a parallel direction to the first gate line part GL1. Alternatively, the gate line GL may only include the first gate line part GL1.

The storage line SL may be simultaneously formed with the gate line GL from the metal layer from which the gate line is formed. The storage line SL is extended, for example, along a parallel direction to the gate line GL between the adjacent gate lines GL. The storage line SL faces the pixel electrode 730, and the gate insulating layer 711 and the passivation layer 770 are disposed between the storage line SL and the pixel electrode 730. The storage line SL, the gate insulating layer 711, the passivation layer 770 and the pixel electrode 730 form a storage capacitor Cst. The storage capacitor Cst maintains a data voltage that is transferred to the pixel electrode 730 through the TFT during one frame. When the color filter layer 720 has a hole in a region corresponding to the storage line SL, a distance between the storage line SL and the pixel electrode 730 is decreased, so that a capacitance of the storage capacitor Cst is increased.

The gate insulating layer 711 is formed on the insulating substrate 760 having the gate line GL and the storage line SL formed thereon. The gate insulating layer 711 protects and electrically insulates the gate line GL from other conductors. The gate insulating layer 711 may include, for example, silicon nitride (SiNx).

The data line DL is formed on the gate insulating layer 711. The data line DL is insulated from the gate line GL and the storage line SL by the gate insulating layer 711. The data line DL is extends in a along a direction and crosses the gate line GL. The data line DL may be extended, for example, along a vertical direction, when viewed on a plane.

The TFT is formed in each pixel to be connected to the gate line GL and the data line DL. The TFT applies the data voltage that is transferred through the data line DL to pixel electrode 730 in response to a gate voltage that is transferred through the gate line GL.

The TFT, which is divided into two regions, may include a first TFT part TFT1 and a second TFT part TFT2 to drive each pixel. The first TFT part TFT1 is electrically connected to the first gate line part GL1 and the data line DL, and the second TFT part TFT2 is electrically connected to the second gate line part GL2 and the data line DL. Alternatively, the TFT may only include the first TFT part TFT1.

The first TFT part TFT1 may include a first gate electrode 712, a first active layer 713, a first source electrode 714 and a first drain electrode 715. The first gate electrode 712 is electrically connected to the first gate line part GL1, and functions as a gate terminal of the first TFT part TFT1. The first active layer 713 is formed on the gate insulating layer 711 corresponding to the first gate electrode 712. The first active layer 713 may include a semiconductor layer 713a and an ohmic contact layer 513b. For example, the semiconductor layer 713a includes amorphous silicon (a-Si), and the ohmic contact layer 513b includes n+ amorphous silicon (n+ a-Si) having n-type impurities implanted therein at a high concentration. The first source electrode 714 is formed on the first active layer 713, and is electrically connected to the data line DL. The first source electrode 714 functions as a source terminal of the first TFT part TFT1. The first drain electrode 715 is spaced apart from the first source electrode 714 on the first active layer 713, and functions as a drain terminal of the first TFT part TFT1. The first drain electrode 715 is electrically connected to a first pixel electrode 731 through a first contact hole CNT1 formed through the passivation layer 770 and the color filter layer 720.

The second TFT part TFT2 may include a second gate electrode 716, a second active layer (not shown), a second source electrode 717 and a second drain electrode 718. The second TFT part TFT2 has substantially the same structure as the first TFT part TFT1 except that the second gate electrode 716 is connected to the second gate line part GL2, and the second drain electrode 718 is connected to a second pixel electrode 732 through a second contact hole CNT2 formed through the passivation layer 770 and the color filter layer 720. Thus, any further explanation concerning the above elements will be omitted.

The TFT layer 710 further includes a first light-blocking layer 740. The first light-blocking layer 740 may be formed, for example, from the metal layer to form the gate line GL. The first light-blocking layer 740 is disposed in a region between adjacent pixels, corresponding to the boundary portion between the adjacent color filters, to prevent light leaking in the boundary portion between the adjacent color filters. For example, when a distance between the adjacent pixel electrodes 730 is about 8 μm, a width of the first light-blocking layer 740 may be no more than about 10 μm.

The first light-blocking layer 740 is partially formed in the region between the adjacent pixel electrodes 730. For example, the first light-blocking layer 740 is electrically separated from the gate line GL and the storage line SL to maintain a floating state. Alternatively, a portion of the first light-blocking layer 740 may be electrically connected to the storage line SL having an applied a common voltage.

The TFT layer 710 may further include a second light-blocking layer 750. The second light-blocking layer 750 may be formed, for example, from the metal layer from which the gate line GL is formed.

The second light-blocking layer 750 is overlapped with the data line DL. When the data line DL and the active layer 713 is patterned through one mask, a dummy active layer 719 is formed under the data line DL. When light is incident into the dummy active layer 719, a waterfall defect may be displayed on the display apparatus. Thus, the second light-blocking layer 750, formed under the data line DL, blocks light incident into the dummy active layer 719, to eliminate the waterfall defect.

The second light-blocking layer 750 is electrically separated from the gate line GL and the storage line SL to maintain a floating state. The second light-blocking layer 750 is electrically connected to the first light-blocking layer 740. Alternatively, the second light-blocking layer may be electrically separated from the first light-blocking layer 740.

The display substrate 700 may further include the passivation layer 770 formed on the TFT layer 710. The passivation layer 770 protects and electrically insulates the TFT layer 710 from other conductors. The passivation layer 770 may include, for example, silicon nitride (SiNx).

The color filter layer 720 is formed on the passivation layer 770. The color filter layer 720 may include a pigment or a colorant. For example, the color filter layer 720 may include a red color filter including a red colorant, a green color filter including a green colorant, and a blue color filter including a blue colorant. The red, green, and blue color filters may be regularly arranged on the passivation layer 770. For example, the red, green, and blue color filters correspond to the pixel parts, respectively.

A thickness of the color filter layer 720 may be increased to planarize a surface of the display substrate 700. For example, the thickness of the color filter layer 720 may be about 2.5 μm to about 3.5 μm.

When the color filter layer 720 is formed in the display substrate 700, an overcoating layer for planarizing the display substrate 700 may be omitted so that the light transmittance of the display apparatus having the color filter layer 720 in the display substrate 700 may be greater than that of a display apparatus having a color filter layer in the opposite substrate 800 by about 7%.

Alternatively, the display substrate 700 may include an organic insulating layer instead of the color filter layer 720.

The pixel electrode 730 is formed on the color filter layer 720 in each pixel. The pixel electrode 730 includes a transparent conductive material, through which light may be transmitted. The pixel electrode 730 may include, for example, indium tin oxide (ITO), indium zinc oxide (IZO), etc.

The pixel electrode 730 has a zigzag shape that is aligned in the extended direction of the data line DL, thereby improving aperture ratio. Thus, the pixel electrode 730 is partially overlapped with the data line DL. The passivation layer 770 and the gate insulating layer 711 are interposed between the pixel electrode 730 and the storage line SL to form the storage capacitor Cst.

The pixel electrode 730 may include a first pixel electrode part 731 and a second pixel electrode part 732 to drive each pixel, which is divided into two regions. The first pixel electrode part 731 and the second pixel electrode part 732 are electrically separated from each other. The first pixel electrode part 731 is electrically connected to the first drain electrode 715 of the first TFT part TFT1 through the first contact hole CNT1, and the second pixel electrode part 732 is electrically connected to the second drain electrode 718 of the second TFT part TFT2 through the second contact hole CNT2.

The pixel electrode 730 is formed in each of the pixels, and a portion of the color filter layer 720 is exposed between the adjacent pixel electrodes 730. Alternatively, an inorganic layer (not shown) may be formed on the exposed portion of the color filter layer 720 between the adjacent pixel electrodes 730 so that impurities included in the color filter layer 720 may not flow out from the color filter layer 720 toward the liquid crystal layer 400.

The opposite substrate 800 is combined with the display substrate 700 to interpose the liquid crystal layer 400 between the opposite substrate 800 and the display substrate 700. The opposite substrate 800 includes an insulating substrate 810, a black matrix 820 and a common electrode 830 that are formed on a surface of the insulating substrate 810 facing the display substrate 700.

The black matrix 820 is partially formed at the boundary portion between adjacent pixel electrodes 730, which corresponds to the region between the adjacent pixels. The black matrix is opened in the region corresponding to the first light-blocking layer 740. The black matrix is disposed in the region between the adjacent pixels to block light incident into the region between the adjacent pixels, thereby improving a contrast ratio. As described above, the first light-blocking layer 740 and the black matrix 820 are formed in the display substrate 700 and the opposite substrate 800, respectively, to effectively prevent light leaking in the boundary portion between the adjacent color filters.

However, when the first light-blocking layer 740 and the black matrix 820 are formed together, an aperture ratio of the display apparatus may be decreased by a misalignment between the display substrate 700 and the opposite substrate 800.

Therefore, the black matrix is partially removed to increase the aperture ratio of the display apparatus. For example, the black matrix is opened in the region between the adjacent pixel electrodes 730 except for a texture generating portion, which corresponds to a corner of the gate line GL, the storage line SL, the TFT and the pixel electrode 830, and a opened portion of the first light-blocking layer 740.

Figure 17:
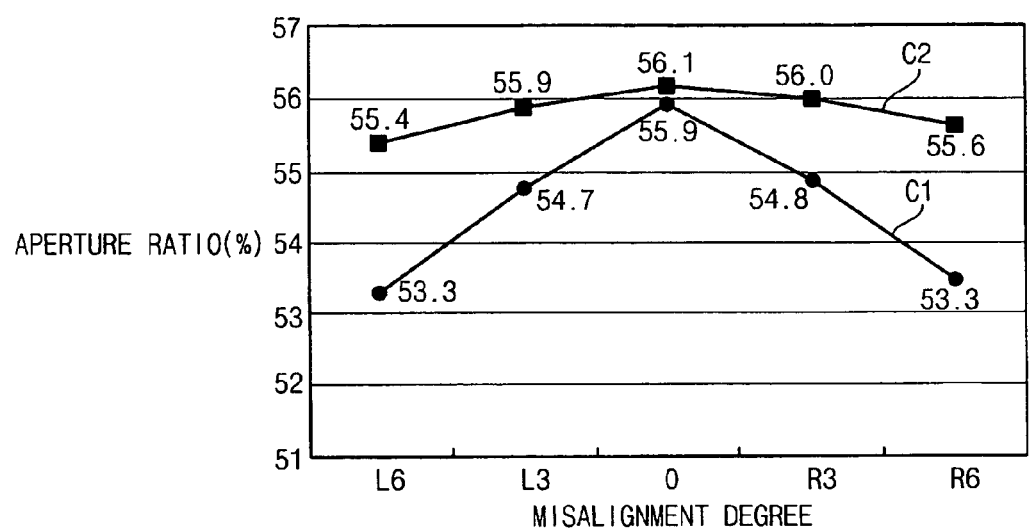
FIG. 17 is a graph illustrating a shift of an aperture ratio according to a misalignment degree between a display substrate and an opposite substrate.

FIG. 17 is a graph illustrating a shift of the aperture ratio according to a misalignment degree between the display substrate and the opposite substrate. In FIG. 17, C1 represents a shift of the aperture ratio when a black matrix is formed over the entire region between the adjacent pixel electrodes, and C2 represents a shift of the aperture ratio when a black matrix is partially opened in the region between the adjacent pixel electrodes as shown in FIG. 14.

Referring to FIG. 17, when the black matrix is formed over the entire region between the adjacent pixel electrodes, the aperture ratio is significantly decreased as the misalignment degree is increased. However, as the black matrix is partially opened in the region between the adjacent pixel electrodes, the shift of aperture ratio is smaller than that of C1 as the misalignment degree is increased, and the aperture ratio is greater overall than that of C1.

The common electrode 830 includes a transparent conductive material that transmits light. For example, the common electrode 830 includes indium zinc oxide (IZO), indium tin oxide (ITO), etc. The common electrode 830 may include substantially the same material as the pixel electrode 730. The common electrode 830 may have an opening pattern to increase a viewing angle.

The opposite substrate 800 may further include an overcoating layer 840 that is formed on the insulating substrate 810 having the black matrix formed thereon for planarizing the opposite substrate 800.

According to one embodiment, a light-blocking layer is formed in a display substrate from a gate metal layer or a data metal layer, to prevent light leaking in a boundary portion between adjacent color filters.

Also, a black matrix and an overcoating layer may be omitted in an opposite substrate, so that manufacturing costs may be greatly decreased and luminance may be increased.

Additionally, a first light-blocking layer formed between adjacent pixel electrodes is electrically separated from a second light-blocking layer overlapped with a data line, so that the load of the data line is decreased, thereby decreasing the delay of a signal transferred through the data line.

Furthermore, the portion of the black matrix, overlapped with the light-blocking layer formed in the display substrate, is removed, to increase the aperture ratio of a display apparatus.

Having described the exemplary embodiments and their advantages, it is noted that various changes, substitutions, and alterations can be made herein without departing from the spirit and scope of the invention as defined by appended claims.

What is claimed is:

1. A display substrate comprising:
   a gate line;
   a gate insulating layer covering the gate line;
   a data line formed on the gate insulating layer;

a thin film transistor electrically connected to the gate line and the data line;
a storage line including the same material as the gate line;
a passivation layer covering the data line;
a color filter layer formed on the passivation layer;
a pixel electrode formed on the color filter layer in each pixel;
a first light-blocking layer formed between adjacent pixel electrodes; and a second light-blocking layer formed between the first light-blocking layer and the gate line, and
wherein the first light-blocking layer is formed on the same layer as the gate line and the second light-blocking layer is formed on the same layer as the data line.

2. The display substrate of claim 1, wherein the color filter layer comprises a plurality of color filters having different colors, and the first and second light-blocking layers are formed at a boundary portion between the adjacent color filters.

3. The display substrate of claim 2, wherein the first light-blocking layer is electrically connected to the storage line.

4. The display substrate of claim 2, wherein the first light-blocking layer is spaced apart from the gate line and the storage line to maintain a floating state.

5. The display substrate of claim 4, wherein the second light-blocking layer is further formed between the first light-blocking layer and the storage line.

6. The display substrate of claim 2, wherein the second light-blocking layer is spaced apart from the data line to maintain a floating state.

7. The display substrate of claim 2, wherein the second light-blocking layer is electrically connected to the data line.

8. The display substrate of claim 2, wherein the pixel electrode has a zigzag shape aligned in an extended direction of the data line to be overlapped with the data line.

9. The display substrate of claim 8, wherein the pixel electrode comprises a first pixel electrode part and a second pixel electrode part electrically separated from each other,
the thin film transistor (TFT) includes a first TFT part electrically connected to the first pixel electrode part and a second TFT part electrically connected to the second pixel electrode part, and
the gate line includes a first gate line part electrically connected to the first TFT part and a second gate line part electrically connected to the second TFT part, the second gate line part being disposed between the first gate line part and the storage line.

10. The display substrate of claim 9, wherein the first light-blocking layer comprises:
a first light-blocking part formed between the first gate line part and the storage line;
a second light-blocking part formed between the second gate line part and the storage line; and
a third light-blocking part formed between the first gate line part and the second gate line part.

11. The display substrate of claim 10, wherein the second light-blocking layer comprises:
a fourth light-blocking part formed between the first gate line part and the first light-blocking part;
a fifth light-blocking part formed between the second gate line part and the second light-blocking part;
a sixth light-blocking part formed between the second gate line part and the third light-blocking part; and
a seventh light-blocking part formed between the first gate line part and the third light-blocking part.

12. The display substrate of claim 11, wherein the fourth light-blocking part and the seventh light-blocking part are spaced apart from the data line to maintain a floating state, and the fifth light-blocking part and the sixth light-blocking part are electrically connected to the data line.

13. The display substrate of claim 11, wherein the second light-blocking layer further comprises:
an eighth light-blocking part formed between the storage line and the first light-blocking part; and
a ninth light-blocking part formed between the storage line and the second light-blocking part.

14. A display substrate comprising:
a gate line;
a storage line having the same material as the gate line;
a gate insulating layer covering the gate line;
a data line formed on the gate insulating layer;
a thin film transistor (TFT) being electrically connected to the gate line and the data line;
a passivation layer covering the data line;
a color filter layer formed on the passivation layer;
a pixel electrode formed on the color filter layer in each pixel; and
a light-blocking part formed between the adjacent pixel electrodes,
wherein the light-blocking part comprises:
a first light-blocking layer formed on the same layer as the gate line; and
a second light-blocking layer formed on the same layer as the data line.

15. The display substrate of claim 14, wherein the color filter layer comprises a plurality of color filters having different colors, and the data line and the light-blocking part are disposed at a boundary portion between the adjacent color filters.

16. The display substrate of claim 15, wherein the light-blocking part includes the same material as the gate line.

17. The display substrate of claim 15, wherein the light-blocking part includes the same material as the data line.

18. The display substrate of claim 15, wherein the light-blocking part comprises:
a first light-blocking layer includes the same material as the gate line; and
a second light-blocking layer includes the same material as the data line.

19. The display substrate of claim 18, wherein the first light-blocking layer is electrically connected to the gate line, and the second light-blocking layer is electrically connected to the data line.

20. The display substrate of claim 15, wherein the pixel electrode has a zigzag shape aligned in an extended direction of the data line to be overlapped with the data line.

21. The display substrate of claim 20, wherein the pixel electrode comprises a first pixel electrode part and a second pixel electrode part electrically separated from each other,
the thin film transistor (TFT) includes a first TFT part electrically connected to the first pixel electrode part and a second TFT part electrically connected to the second pixel electrode part, and
the gate line includes a first gate line part electrically connected to the first TFT part and a second gate line part electrically connected to the second TFT part, the second gate line part being disposed between the first gate line part and the storage line.

22. The display substrate of claim 21, wherein the data line is disposed at the boundary portion between the adjacent color filters between the first gate line part and the second gate line part disposed at both sides of the storage line, respectively.

23. The display substrate of claim 22, wherein the light-blocking part is disposed between the first gate line part and the data line.

24. A display apparatus comprising:
a display substrate including:
a gate line, a gate insulating layer covering the gate line, a data line formed on the gate insulating layer, a thin film transistor electrically connected to the gate line and the data line and a storage line including the same material as the gate line;
a passivation layer covering the data line;
a color filter layer formed on the passivation layer;
a pixel electrode formed on the color filter layer in each pixel;
a first light-blocking layer formed between the adjacent pixel electrodes, the first light-blocking layer formed on the same layer as the gate line; and
a second light-blocking layer formed between the first light-blocking layer and the gate line, the second light-blocking layer formed on the same layer as the data line;
an opposite substrate combined with the display substrate, the opposite substrate including a common electrode on a surface facing the display substrate; and
a liquid crystal layer interposed between the display substrate and the opposite substrate.

25. A display substrate comprising:
a gate line;
a gate insulating layer covering the gate line;
a data line formed on the gate insulating layer;
a thin film transistor electrically connected to the gate line and the data line;
a storage line including the same material as the gate line;
a color filter layer formed on the gate insulating layer;
a pixel electrode formed on the color filter layer in each pixel;
a first light-blocking layer formed between the adjacent pixel electrodes, the first light-blocking layer including the same material as the gate line; and
a second light-blocking layer formed to be overlapped with the data line, the second light-blocking layer including the same material as the gate line, the second light-blocking layer being electrically separated from the first light-blocking layer.

26. The display substrate of claim 25, wherein the color filter layer comprises a plurality of color filters having different colors, and the first light-blocking layer is disposed at a boundary portion between the adjacent color filters.

27. The display substrate of claim 25, wherein the first light-blocking layer is electrically separated from the gate line and the storage line to maintain a floating state.

28. The display substrate of claim 25, wherein a portion of the first light-blocking layer is electrically connected to the storage line.

29. The display substrate of claim 25, wherein the second light-blocking layer is electrically separated from the gate line, the storage line and the first light-blocking layer to maintain a floating state.

30. The display substrate of claim 25, wherein the pixel electrode has a zigzag shape aligned in an extended direction of the data line to be overlapped with the data line.

31. The display substrate of claim 25, further comprising an active layer disposed between the data line and the second light-blocking layer.

32. The display substrate of claim 25, wherein the pixel electrode comprises a first pixel electrode part and a second pixel electrode part electrically separated from each other, the thin film transistor (TFT) includes a first TFT part electrically connected to the first pixel electrode part and a second TFT part electrically connected to the second pixel electrode part, and
the gate line includes a first gate line part electrically connected to the first TFT part and a second gate line part electrically connected to the second TFT part, the second gate line part being substantially parallel with the first gate line part.

33. A display apparatus comprising:
a display substrate including:
a gate line;
a gate insulating layer covering the gate line;
a data line formed on the gate insulating layer;
a thin film transistor electrically connected to the gate line and the data line;
a storage line including the same material as the gate line;
a color filter layer formed on the gate insulating layer;
a pixel electrode formed on the color filter layer in each pixel;
a first light-blocking layer formed between the adjacent pixel electrodes, the first light-blocking layer including the same material as the gate line; and
a second light-blocking layer formed to be overlapped with the data line, the second light-blocking layer including the same material as the data line, the second light-blocking layer being electrically separated from the first light-blocking layer;
an opposite substrate combined with the display substrate, the opposite substrate including a common electrode on a surface facing the display substrate; and
a liquid crystal layer interposed between the display substrate and the opposite substrate.

34. A display apparatus comprising:
a display substrate including:
a thin film transistor (TFT);
a color filter layer formed on the thin film transistor;
a pixel electrode formed on the color filter layer in each pixel; and
a first light-blocking layer partially formed at a boundary portion between the adjacent pixel electrodes;
an opposite substrate including a black matrix and a common electrode facing the pixel electrode, the black matrix being partially formed at the boundary portion between the adjacent pixel electrodes; and
a liquid crystal layer interposed between the display substrate and the opposite substrate,
wherein the display substrate further comprises a second light-blocking layer formed on the same layer as the data line.

35. The display apparatus of claim 34, wherein the black matrix is opened in a region corresponding to the first light-blocking layer.

36. The display apparatus of claim 35, wherein the color filter layer comprises a plurality of color filters having different colors, and the first light-blocking layer and the black matrix are disposed at a boundary portion between the adjacent color filters.

37. The display apparatus of claim 35, wherein the display substrate further comprises:
a gate line;
a data line electrically insulated from the gate line by a gate insulating layer; and
a storage line including the same material as the gate line, and, the thin film transistor is electrically connected to the gate line and the data line.

38. The display apparatus of claim 37, wherein the black matrix is further formed facing to the gate line, the thin film transistor, the storage line and a texture generating portion.

39. The display apparatus of claim 37, wherein the first light-blocking layer is electrically separated from the gate line and the storage line to maintain a floating state.

40. The display apparatus of claim 37, wherein a portion of the first light-blocking layer is electrically connected to the storage line.

41. The display apparatus of claim 37, wherein the pixel electrode has a zigzag shape aligned in an extended direction of the data line to be overlapped with the data line.

42. The display apparatus of claim 41, wherein the display substrate further comprises a second light-blocking layer including the same material as the data line.

43. The display apparatus of claim 37, wherein the pixel electrode comprises a first pixel electrode part and a second pixel electrode part electrically separated from each other,
the thin film transistor (TFT) includes a first TFT part electrically connected to the first pixel electrode part and a second TFT part electrically connected to the second pixel electrode part, and
the gate line includes a first gate line part electrically connected to the first TFT part and a second gate line part electrically connected to the second TFT part.

* * * * *